United States Patent
Afridi et al.

(10) Patent No.: US 12,288,994 B2
(45) Date of Patent: Apr. 29, 2025

(54) ACTIVE VARIABLE REACTANCE RECTIFIER CIRCUIT AND RELATED TECHNIQUES

(71) Applicant: The Regents of the University of Colorado, a body corporate, Denver, CO (US)

(72) Inventors: Khurram K. Afridi, Boulder, CO (US); Ashish Kumar, Boulder, CO (US); Sreyam Sinha, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/309,878

(22) PCT Filed: Jun. 15, 2017

(86) PCT No.: PCT/US2017/037802
§ 371 (c)(1),
(2) Date: Dec. 13, 2018

(87) PCT Pub. No.: WO2017/218856
PCT Pub. Date: Dec. 21, 2017

(65) Prior Publication Data
US 2019/0165614 A1    May 30, 2019

Related U.S. Application Data

(60) Provisional application No. 62/350,477, filed on Jun. 15, 2016.

(51) Int. Cl.
*H02J 50/12*    (2016.01)
*H02J 7/00*    (2006.01)
(Continued)

(52) U.S. Cl.
CPC ........... *H02J 50/12* (2016.02); *H02J 7/00712* (2020.01); *H02J 50/05* (2016.02); *H02M 7/217* (2013.01); *H02M 3/33573* (2021.05)

(58) Field of Classification Search
CPC .. H02J 50/10; H02J 50/12; H02J 50/00; H02J 7/00; H02M 7/00
See application file for complete search history.

(56) References Cited

U.S. PATENT DOCUMENTS 5,574,967 A   11/1996  Dent et al.
9,263,895 B2 *  2/2016  Naiknaware ............ H02M 7/42
(Continued)

FOREIGN PATENT DOCUMENTS

WO    2015/069516 A1    5/2015

OTHER PUBLICATIONS

International Search Report and Written Opinion for PCT/US2017/037802, dated Nov. 13, 2017, 15 pages.
(Continued)

*Primary Examiner* — Elim Ortiz
*Assistant Examiner* — Joseph N Inge
(74) *Attorney, Agent, or Firm* — Workman Nydegger

(57) ABSTRACT

In one example, an active variable reactance rectifier circuit includes an active variable reactance rectifier circuit input port and an output port. A power splitter circuit includes an input port coupled to the active variable reactance rectifier circuit input port and a pair of output ports. A first rectifier circuit includes an input port is coupled to the first power splitter circuit output port. A second rectifier circuit includes an input port coupled to the second power splitter circuit output port. A power combiner circuit includes a first input port, a second input port and an output port. The first power combiner circuit input port is coupled to the first rectifier circuit output port, the second power combiner circuit input
(Continued)

Basic AVR Rectifier port is coupled to the second rectifier circuit output port and the power combiner circuit output port is coupled to the active variable reactance rectifier circuit output port.

15 Claims, 34 Drawing Sheets

(51) Int. Cl.
    *H02J 50/05*     (2016.01)
    *H02M 3/335*     (2006.01)
    *H02M 7/217*     (2006.01)

(56) References Cited

U.S. PATENT DOCUMENTS

| | | |
|---|---|---|
| 2012/0008651 A1 | 4/2012 | Hauer et al. |
| 2012/0086519 A1 | 4/2012 | Hauer et al. |
| 2013/0034310 A1 | 2/2013 | Chen et al. |
| 2013/0343106 A1* | 12/2013 | Perreault ............... H03F 3/195 363/67 |
| 2015/0018844 A1 | 1/2015 | Harris |
| 2015/0188446 A1* | 7/2015 | Wu ....................... H02M 1/143 320/108 |
| 2016/0002582 A1 | 1/2016 | Lin et al. |
| 2016/0006365 A1 | 1/2016 | Perreault et al. |
| 2016/0025821 A1 | 1/2016 | Widmer et al. |
| 2016/0301257 A1* | 10/2016 | Parks ....................... H02J 50/20 |
| 2017/0302083 A1* | 10/2017 | Bolus ....................... H02J 5/00 |

OTHER PUBLICATIONS

Sinha et al., "A Multi-MHz Large Air-gap Capacitive Wireless Power Transfer System Utilizing an Active Variable Reactance Rectifier Suitable for Dynamic Electric Vehicle Charging," 2019 IEEE Energy Conversion Congress and Exposition (ECCE), IEEE, Sep. 29, 2019, pp. 5726-5732.

Sinha et al., "Active variable reactance rectifier—A new approach to compensating for coupling variations in wireless power transfer systems," 2017 IEEE 18th Workshop on Control and Modeling for Power Electronics (Compel), IEEE, Jul. 9, 2017, pp. 8.

\* cited by examiner

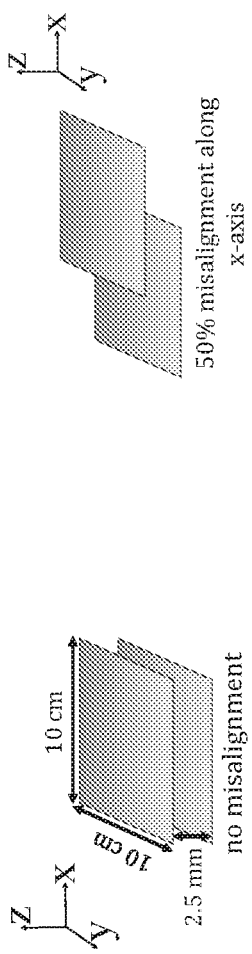
FIG. 10(A)
FIG. 10(B)
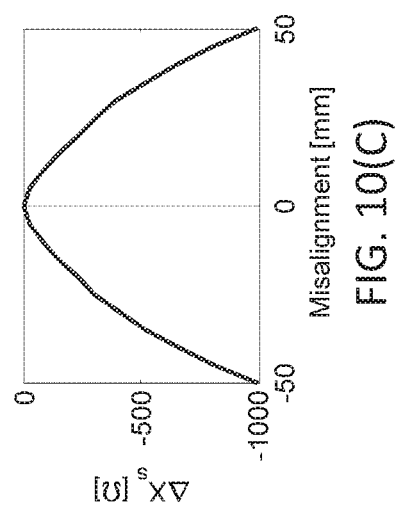
FIG. 10(C)

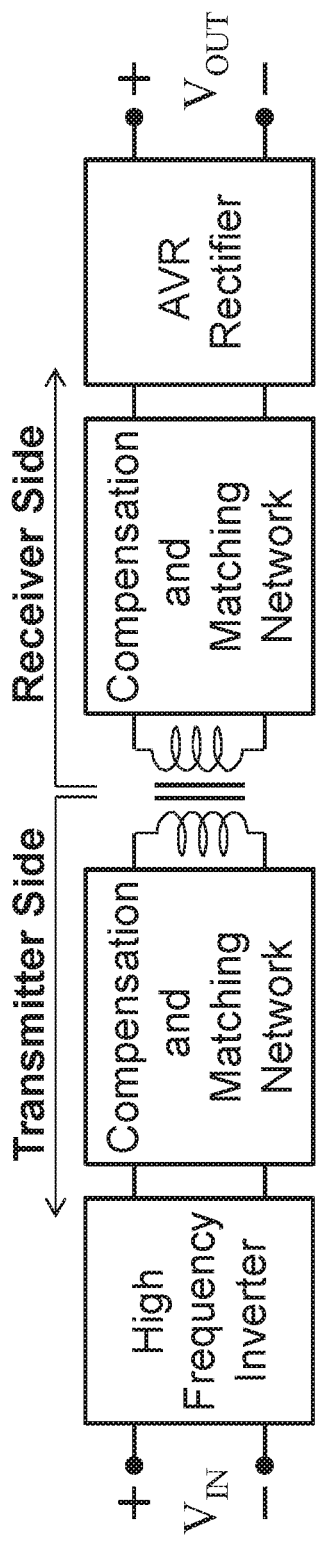
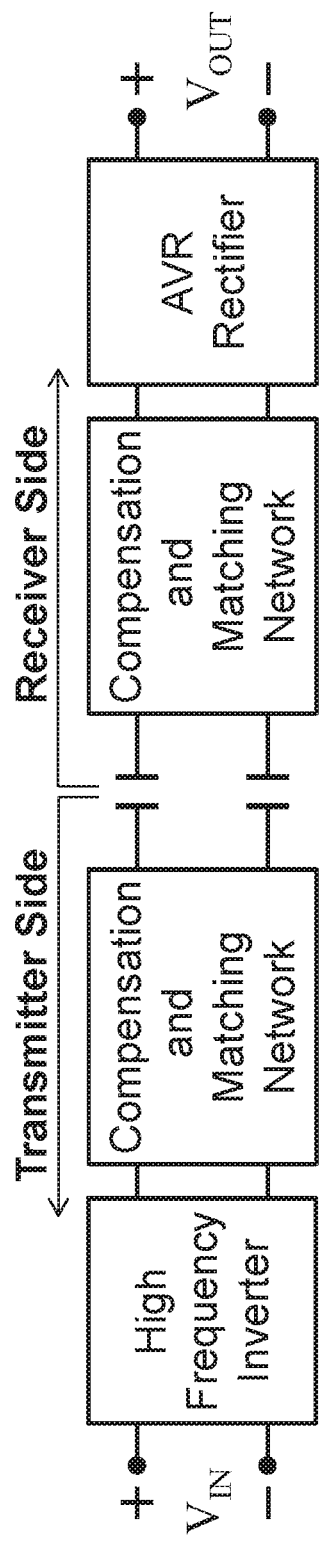
FIG. 28(A)
FIG. 28(B)

ACTIVE VARIABLE REACTANCE RECTIFIER CIRCUIT AND RELATED TECHNIQUES

CROSS-REFERENCE TO RELATED APPLICATIONS

This application is a U.S. National Stage of International Application No. PCT/US2017/037802, filed Jun. 15, 2017, which claims the benefit of U.S. provisional application No. 62/350,477, filed Jun. 15, 2016, each of which are hereby incorporated by reference as though fully set forth herein.

BACKGROUND a. Field

The instant invention relates to an active variable reactance rectifier circuit.

b. Background

Wireless power transfer (WPT) provides convenience, enables new functionality and improves our quality of life by enabling autonomous charging in applications ranging from electric vehicles (EVs) and robotics to portable electronics and biomedical implants. The size of WPT systems can be decreased by increasing their operating frequency. To achieve high efficiencies at high switching frequencies, the resonant inverters and resonant rectifiers (collectively resonant converters) of WPT systems must maintain soft-switching across wide operating conditions. Furthermore, to achieve effective power transfer, WPT systems need to operate at frequencies close to the resonance frequency of a resonant tank formed by the coupling capacitance or inductance of their coupler and the reactance of the compensation components (see FIG. 1). However, as the transmitter and receiver move relative to one another, the coupling reactance changes, with a resultant shift in the resonance frequency. This results in a reduction in power transfer capability and efficiency of the WPT system. The degradation in efficiency can be particularly severe when using single switch inverters, as is typically done at high frequencies, as these lose soft-switching when detuned.

In WPT systems operating at low frequencies, where bandwidths are not restrictive (such as below 150 kHz), the traditional approach to dealing with variations in coupling is to change the operating frequency to track the resonance frequency of the system. However, in high-frequency WPT systems the operating frequency must stay within one of the designated industrial, scientific and medical (ISM) bands (e.g., 6.78 MHz, 13.56 MHz and 27.12 MHz) which have very restricted bandwidths. One solution that is employed in low power (up to a few Watts) inductive WPT systems is to use a bank of capacitors that can be switched in and out of the compensating network, so as to keep the resonant frequency roughly unchanged as the source and load move relative to each other. However, this is not an effective approach for higher power WPT systems as the switches have to be much bigger and more expensive to keep the system efficient. Also this approach is less suited to capacitive WPT, as it requires multiple switchable compensating inductors which are bigger than capacitors. Other adaptive impedance matching techniques have also been employed, including the use of saturable and variable inductors. However, these techniques reduce system efficiency and do not scale well with power.

An alternate approach to compensate for changes in coupling is to use the effective capacitance or inductance of an actively controlled rectifier (e.g., a full-bridge). In this approach, instead of having the rectifier look purely resistive, the turn-on and turn-off of its active switches is phase shifted relative to the current flowing through it. By delaying the turn-on and turn-off of the switches, the rectifier can be made to look partly capacitive, while by advancing the switch turn-on and turn-off the rectifier can be made to look partly inductive. An advantage of this approach is that the compensating reactance can be varied continuously by varying the switch turn-on/off instants. However, this approach results in additional losses in the rectifier as the rectifier switches are no longer turning off near zero-current crossings. Furthermore, when the turn-on/off of the rectifier switches is advanced relative to the current zero crossings, the switches lose zero-voltage switching (ZVS) turn-on, which severely degrades efficiency at high switching frequencies and high output voltages. Hence, there is a need for a better approach to vary the compensating reactance, ideally one that can provide a continuously variable compensating reactance while maintaining soft-switching.

BRIEF SUMMARY

In one implementation, for example, "active variable reactance" (AVR) rectifiers are provided comprising reactive components and appropriately controlled rectifier(s) that are configured to compensate for large changes in coupling in inductive and capacitive WPT, while maintaining relatively high power transfer capability and efficiency. This implementation of WPT may allow for maintaining relatively high power transfer capability and high efficiency. AVR rectifiers can also be utilized in many other power conversion applications, including resonant converters where its use can compensate for tolerances in component values.

In one implementation, for example, an active variable reactance (AVR) rectifier circuit is provided. In one example implementation, the circuit includes an active variable reactance rectifier circuit input port and an active variable reactance rectifier circuit output port adapted to couple to a load. A power splitter circuit includes a power splitter circuit input port coupled to the active variable reactance rectifier circuit input port, a first power splitter circuit output port and a second power splitter circuit output port. A first rectifier circuit includes a first rectifier circuit input port and a first rectifier circuit output port. The first rectifier circuit input port is coupled to the first power splitter circuit output port. A second rectifier circuit includes a second rectifier circuit input port and a second rectifier circuit output port. The second rectifier circuit input port is coupled to the second power splitter circuit output port. A power combiner circuit includes a first power combiner circuit input port, a second power combiner circuit input port and a power combiner circuit output port. The first power combiner circuit input port is coupled to the first rectifier circuit output port, the second power combiner circuit input port is coupled to the second rectifier circuit output port and the power combiner circuit output port is coupled to the active variable reactance rectifier circuit output port.

In another implementation, a wireless power transfer (WPT) system includes a transmitter side including a WPT system input port; a receiver side including a WPT system output port; a WPT circuit comprising at least one of a capacitive coupling and an inductive coupling; and an active variable reactance rectifier circuit coupled between the WPT transfer circuit and the WPT system output port of the receiver side, wherein the active variable reactance rectifier circuit provides a continuously variable input reactance.

In yet another implementation, an active variable reactance rectifier circuit includes a plurality of rectifier circuits each comprising a rectifier input port and a rectifier output port, the rectifier input port coupled to an active variable reactance rectifier circuit input port via a reactive network; and a power combiner circuit comprising a plurality of combiner input ports each coupled to a respective one of the plurality of rectifier output ports and a combiner output port coupled to an active variable reactance circuit output port. The power combiner circuit is adapted to alter a plurality of voltage levels at the plurality of rectifier output ports and the power combiner circuit is also adapted to alter a plurality of voltage levels at the plurality of rectifier output ports In another implementation, a rectifier architecture is provided having an input impedance that can be continuously varied between purely resistive, partially inductive and partially capacitive. In this particular example, this can be achieved while maintaining soft-switching and high efficiency in the rectifier. In this particular implementation, the AVR rectifier provides a widely applicable technology, with applications in both inductive and capacitive wireless power transfer. This rectifier can be used to effectively compensate for variations in coupling between the transmitter and the receiver, while operating the WPT system at a fixed frequency.

In yet another implementation, the AVR rectifier can also be designed as an ac/ac converter for synthesizing an ac output component at frequencies far below the switching frequency. The architecture for an AVR ac/ac converter could incorporate an unfolding bridge at its output. Another feature of this architecture is that it can allow bi-directional power flow with appropriate inverter/rectifier stages.

In another implementation, for example, a method of rectifying an input signal is provided. In this implementation, the method comprises actively controlling at least two rectifier components to compensate for large changes in coupling in inductive and capacitive WPT, while maintaining relatively high power transfer capability and efficiency.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 10(a) and 10(b) depict a schematic diagram of an example pair of coupling plates in an aligned configuration (FIG. 10(a)) and in a misaligned configuration (FIG. 10(b)), respectively.

FIG. 10(c) depicts a graph showing a change in coupling reactance when the transmitting and the receiving sides of the example coupling plates shown in FIGS. 10(a) and 10(b) are aligned or misaligned.

FIGS. 28(a) and 28(b) depict schematic diagrams of example wireless power transfer systems including example implementations of an AVR rectifier circuit, according to one or more embodiments described and shown herein.

DETAILED DESCRIPTION

Figure 1:
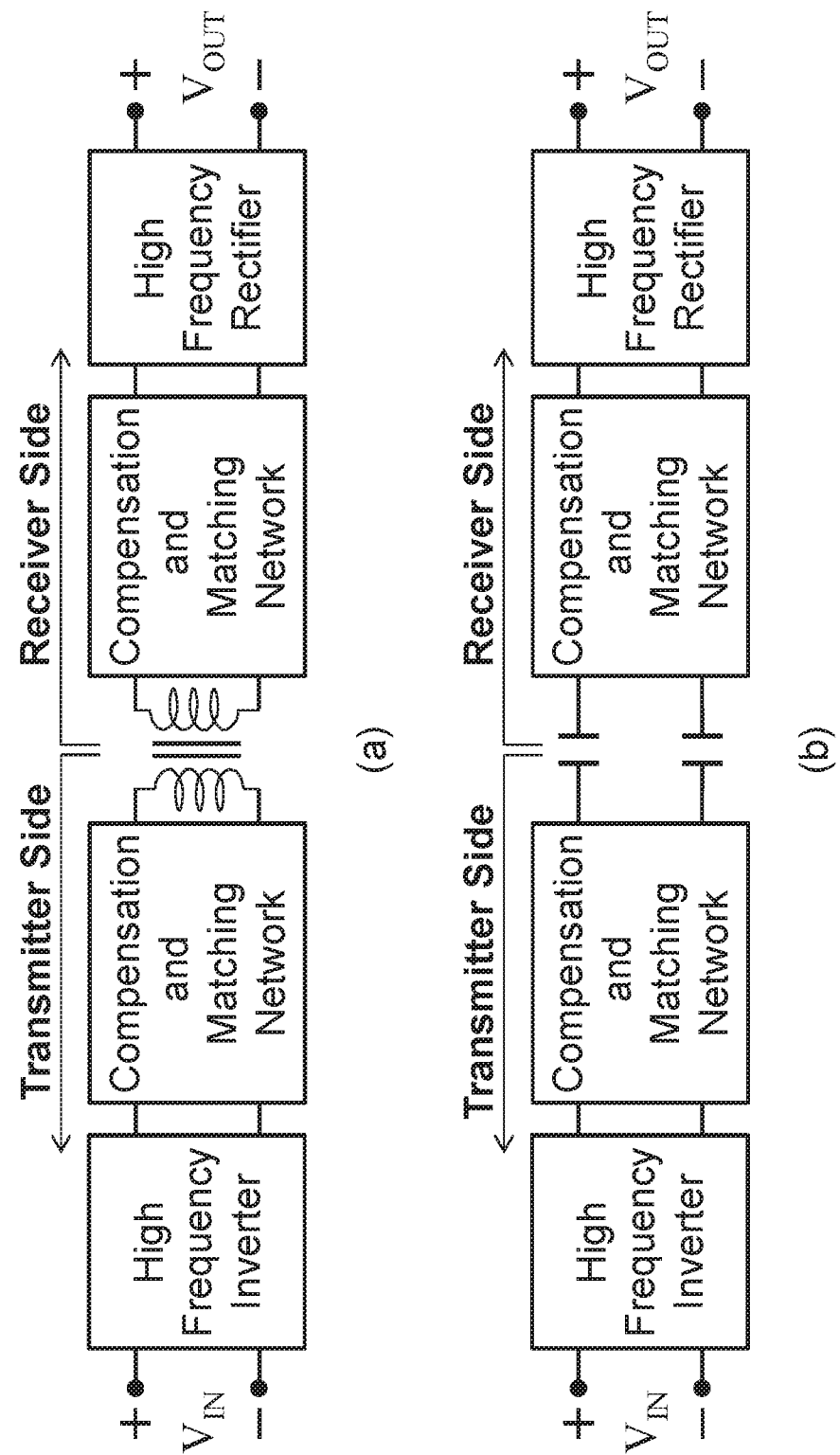
FIG. 1 depicts a schematic diagram of example capacitive and inductive coupling wireless power transfer systems.
Figure 2:
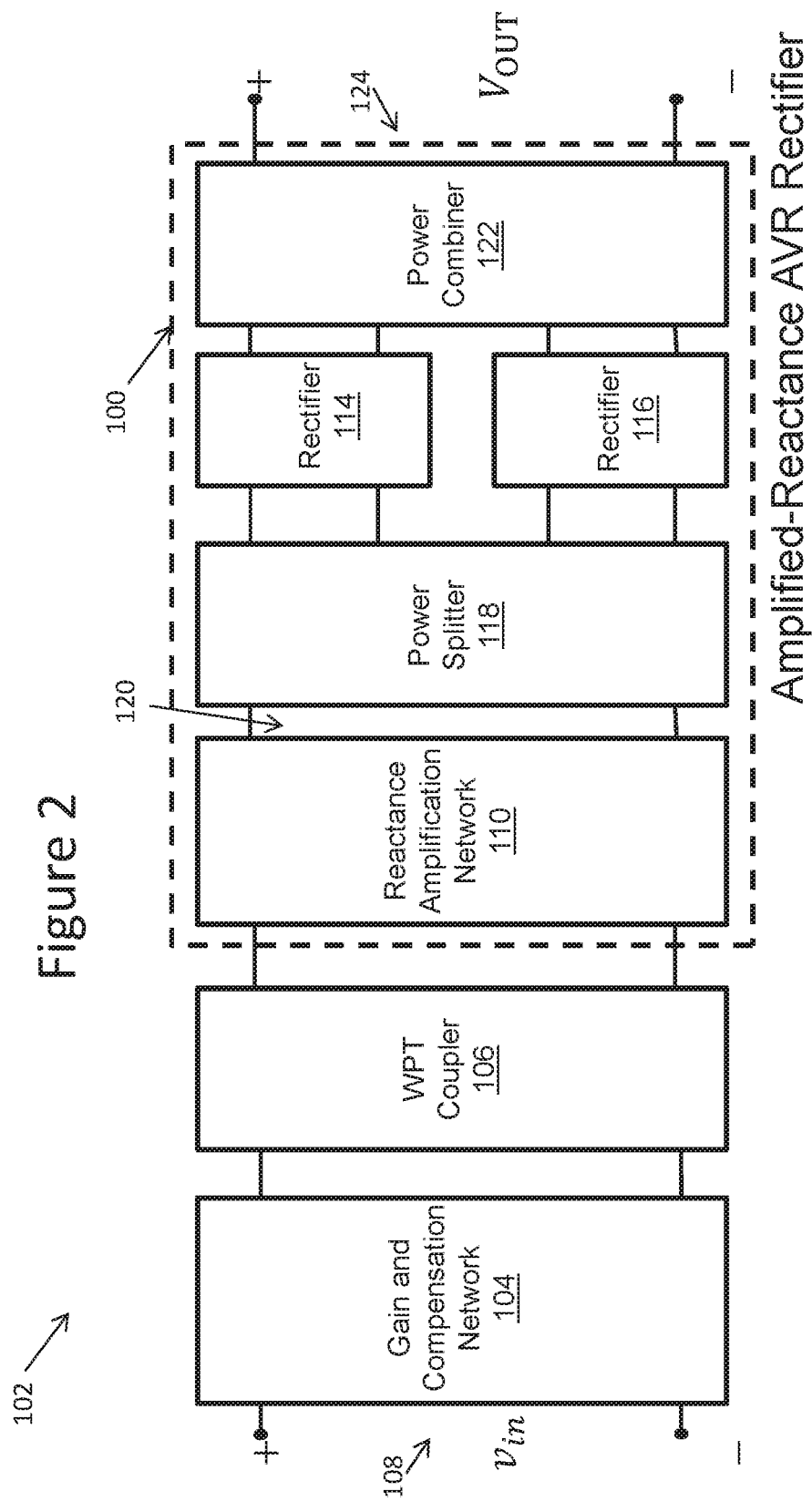
FIG. 2 depicts a schematic diagram of an example wireless power transfer system including an amplified reactance active variable reactance (AVR) rectifier circuit, according to one or more embodiments described and shown herein.

FIG. 2 illustrates an example utilization of one embodiment of an Active Variable Reactance (AVR) rectifier 100 utilized in a WPT system 102. In this particular implementation, the WPT system comprises a gain and compensation network 104 and a WPT coupler 106 coupled to the AVR rectifier 102. The gain and compensation network 104 is coupled to an input port 108 and receives an ac input voltage $v_{in}$. The gain and compensation network 104 provides a voltage gain (step up or step down) to $v_{in}$ and provides compensation for the reactive impedance of the WPT coupler 106 when there is no misalignment between the two sides of the coupler. The WPT coupler 106 is coupled to the gain and compensation network 104 and the AVR rectifier 100 as shown in FIG. 2.

Figure 3A:
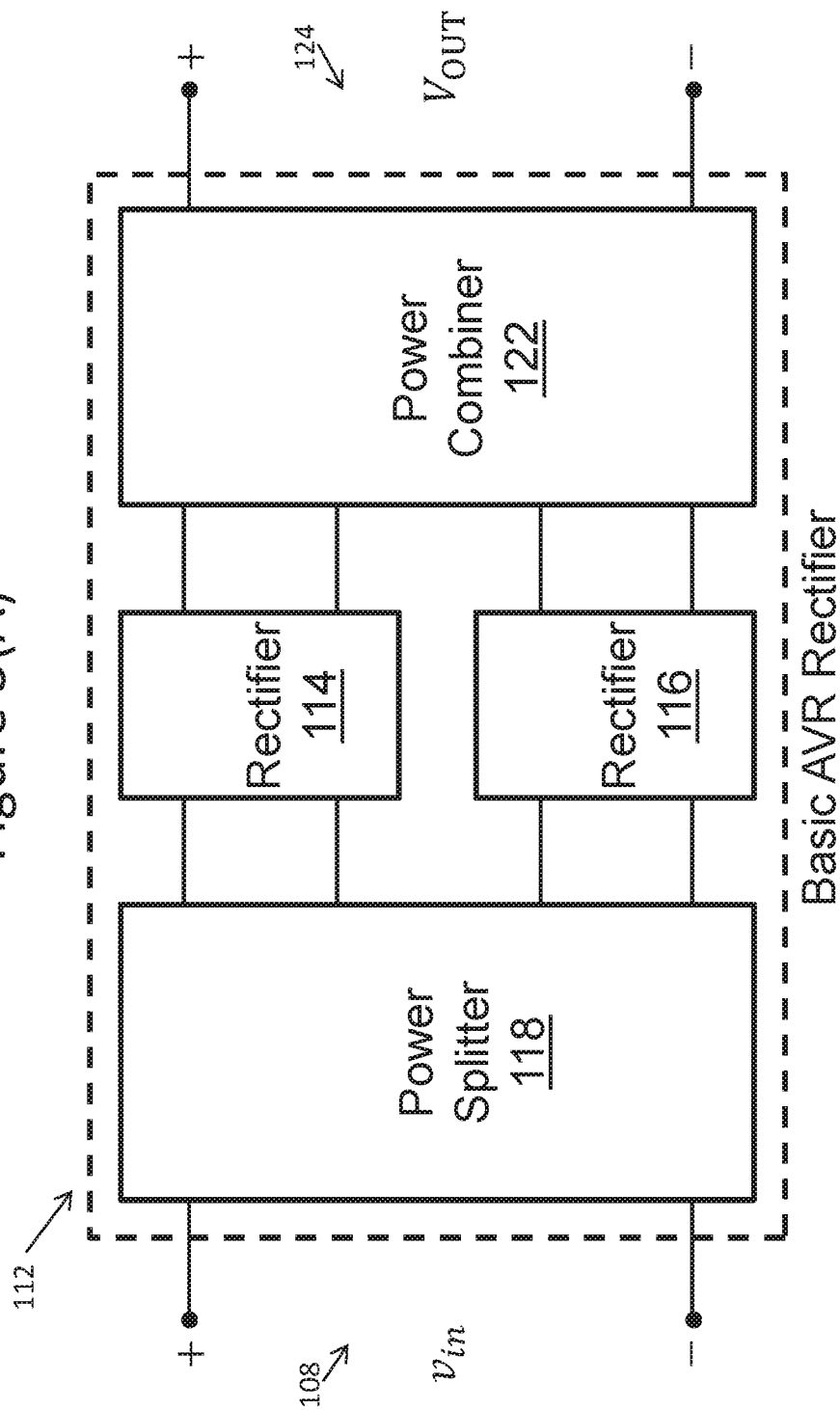
FIG. 3(a) depicts a schematic diagram of an example active variable reactance (AVR) rectifier circuit according to one or more embodiments described and shown herein.

The amplified-reactance AVR rectifier 100, in this implementation, comprises a reactance amplifier network 110 coupled to a "basic" AVR rectifier 112 (shown in FIG. 3(a)). The basic AVR rectifier 112, in this implementation, comprises a plurality of rectifiers 114, 116, a lossless power splitting circuit 118 disposed between an input port 120 of the basic AVR and the rectifiers 114, 116 and a power combining circuit 122 disposed between the rectifiers 114, 116 and an output port 124 of the basic AVR rectifier 112. A dc output voltage, $V_{out}$, is provided at the output port 124. As will be described below, an input impedance of the AVR rectifier 100 depends on the relative voltage at the output of each of its individual rectifiers 114, 116 and the relative timing of the rectifiers' active switches.

In this particular implementation, the amplified-reactance AVR rectifier 100 provides a widely applicable technology, with applications in both inductive and capacitive wireless power transfer. This rectifier 100 can be used to effectively compensate for variations in coupling between a transmitter and a receiver, while operating a WPT system at a fixed frequency. In yet another implementation, the AVR rectifier can also be designed as an ac/ac converter for synthesizing an ac output component at frequencies far below the switching frequency. The architecture for an AVR ac/ac converter would be similar to the one shown in FIG. 2 except it would incorporate an unfolding bridge at its output. Another feature of this architecture is that it can allow bi-directional power flow with appropriate inverter/rectifier stages.

In another implementation, for example, a method of rectifying an input signal is provided. In this implementation, the method comprises actively controlling at least two rectifier components to compensate for large changes in coupling in inductive and capacitive WPT, while maintaining relatively high power transfer capability and efficiency.

Basic Active Variable Reactance Rectifier

Figure 3B:
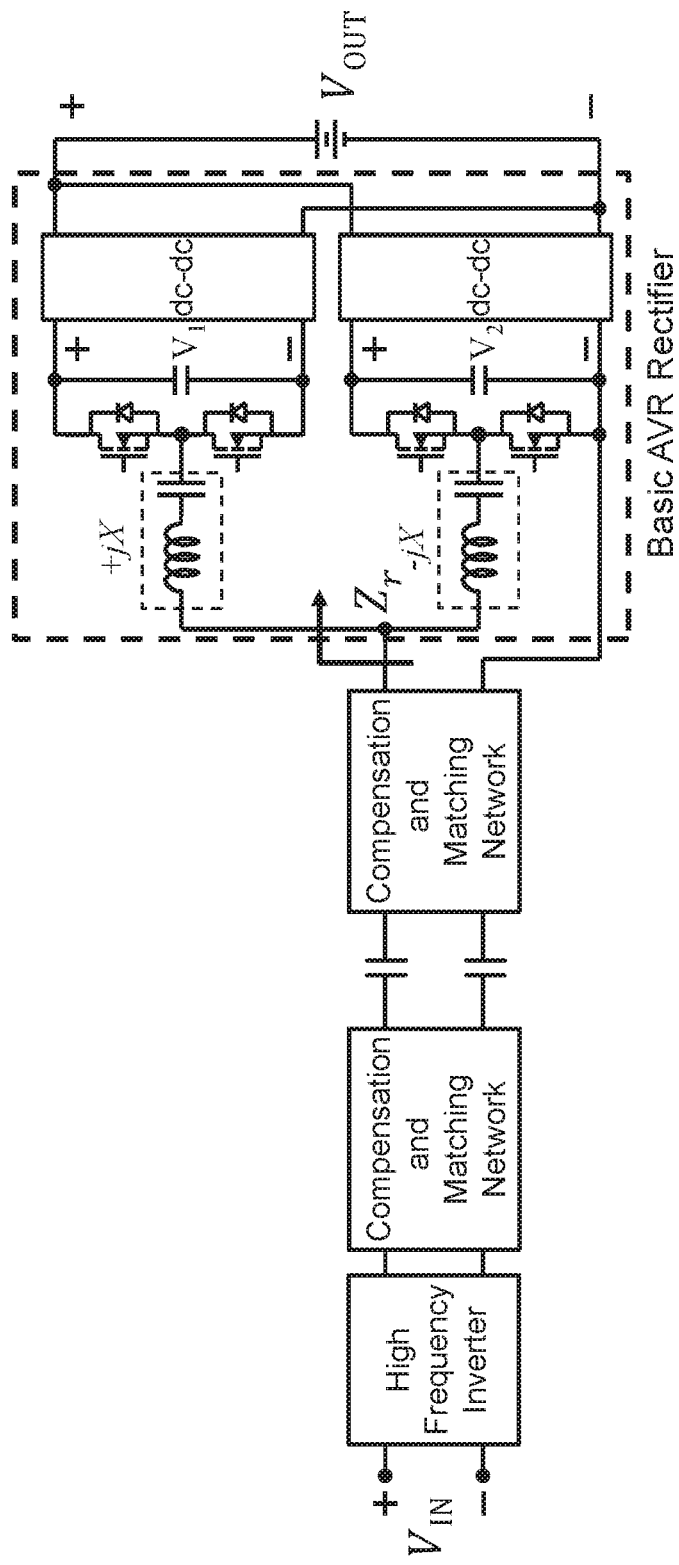
FIG. 3(b) depicts a schematic diagram of an example wireless power transfer system including an example implementation of an AVR rectifier circuit, according to one or more embodiments described and shown herein.

The architecture of a basic AVR rectifier 112 is also shown in FIG. 3(a). The architecture comprises a power splitter 118 with one input port 120 and multiple output ports 126, 128, each of which is interfaced with one of the rectifiers 114, 116. The outputs of the rectifiers 114, 116 are connected to a power combiner 122, which has one output port 124 that connects with the system dc output $V_{out}$. One example implementation of this AVR rectifier architecture in a WPT system is shown in FIG. 3(b). In this AVR rectifier implementation, the power splitter 118 is realized using a lossless resonant network 130 with two branches comprising equal but opposite reactances (+jX and −jX). Those skilled in the art will appreciate that in other implementations, these branches of the power splitter may also comprise unequal reactances (+jX$_1$ and −jX$_2$). The power combiner 122 in the AVR rectifier implementation of FIG. 3(b) is realized using two dc-dc converters 132, 134. Each of the dc-dc converters 132, 134 is coupled between a respective rectifier 114, 116 and the output port 124 of the AVR rectifier 112. The AVR rectifier 112 draws upon the concepts of a resistance compression network (RCN). However, it differs topologically and functionally from an RCN, as the outputs of its rectifiers are not directly connected. Instead the output voltages ($V_1$ and $V_2$) of the AVR's two rectifiers 114, 116 are independently controlled by the two dc-dc converters 132, 134, designed to regulate their input voltages instead of their output voltages. The input impedance of the AVR rectifier 112 under fundamental frequency approximation is given by the following:

$$Z_r = \frac{4V_1^2 V_2^2 \cos^2 \theta_r + \pi^4 P_1 P_2 X^2}{2\pi^2 (P_1 V_2^2 + P_2 V_1^2)} + \quad (1)$$

$$j \frac{2\pi^2 (P_1 V_2^2 - P_2 V_1^2) X - 4V_1^2 V_2^2 \sin \theta_r \cos \theta_r + \pi^4 P_1 P_2 X^2 \tan \theta_r}{2\pi^2 (P_1 V_2^2 + P_2 V_1^2)},$$

where X is the differential reactance of the AVR, $P_1$ and $P_2$ are output power of the top and bottom rectifiers, respectively, and $\theta_r$ is the phase shift of the rectifiers' switch-node voltages relative to their currents. The values of $P_1$ and $P_2$ are positive and depend on $V_1$, $V_2$, $\theta_r$, and other circuit parameters. Since the imaginary part of $Z_r$ has both positive and negative terms, the reactive component of the input impedance of the AVR can be either positive (inductive) or negative (capacitive), depending on the relative values of $V_1$ and $V_2$ and the value of $\theta_r$.

Figure 4:
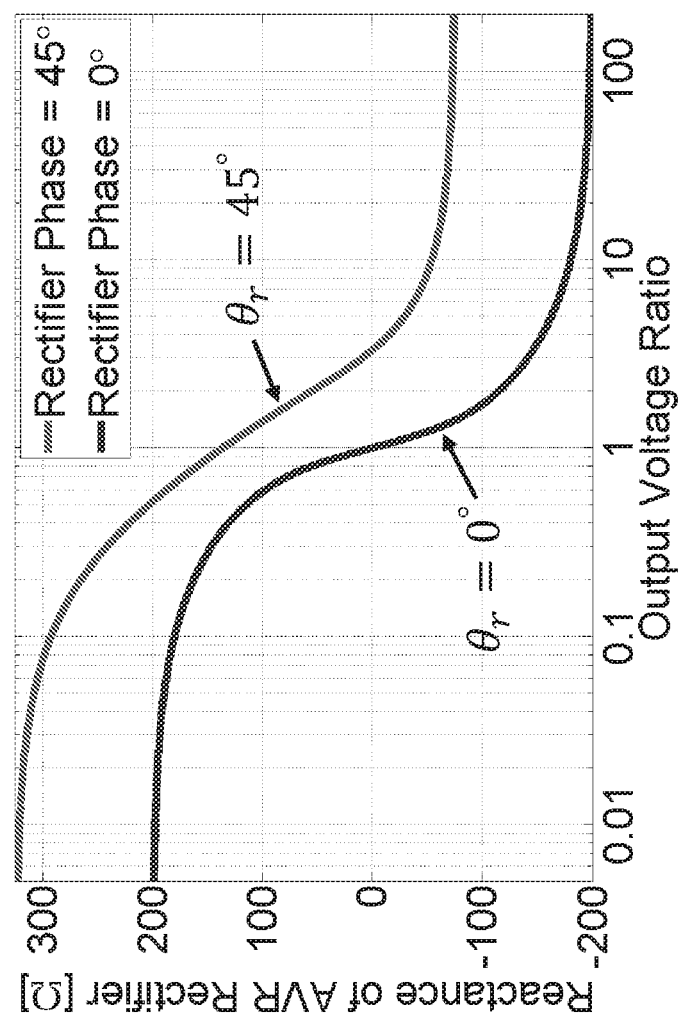
FIG. 4 depicts a graph plotting a variation in an input reactive component $Z_r$ of an example AVR rectifier as a function of an output voltage ratio $V_1/V_2$.

FIG. 4 illustrates a graph plotting the variation in the input reactive component $Z_r$ of the AVR rectifier 112 as a function of the output voltage ratio $V_1/V_2$. When the rectifiers operate with zero phase shift relative to their currents ($\theta_r=0°$, lower curve), and $V_1$ and $V_2$ are equal the AVR functions like an RCN and offers purely resistive impedance. However, with $\theta_r=0°$, when $V_1$ is greater than $V_2$, the AVR looks partly capacitive, and when $V_1$ is less than $V_2$, it looks partly inductive. Hence, the AVR can contribute negative or positive reactance to the compensation network, and overcome changes in coupling reactance.

Figure 5:
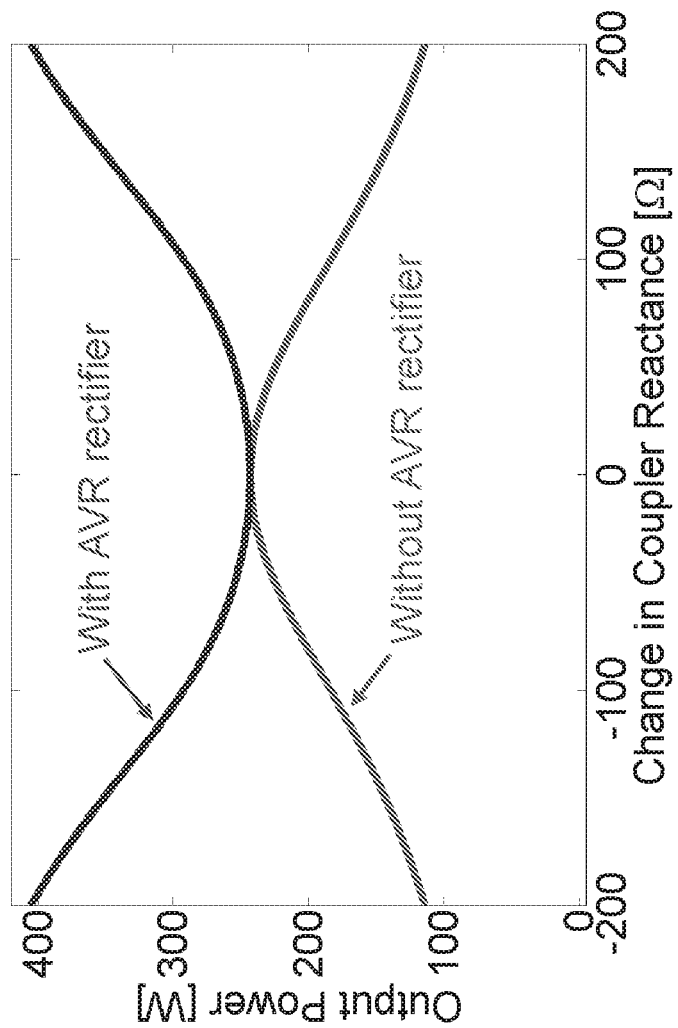
FIG. 5 depicts a graph showing the effectiveness of the example AVR rectifier when the transmitter and receiver move relative to each other, with the resultant change in coupling reactance.

FIG. 5 illustrates another graph showing the effectiveness of the AVR rectifier when the transmitter and receiver move relative to each other, with the resultant change in coupling reactance. Without the AVR, the output power drops significantly with a change in coupling reactance. However, with the AVR and with appropriate values of $V_1$ and $V_2$, the output power does not drop. Since the values of $V_1$ and $V_2$ also affect the real part of the input impedance of the AVR rectifier, the maximum deliverable power depends on the choice of specific voltage values. In the example of FIG. 5, $V_1$ and $V_2$ are varied while holding their sum constant (a suitable choice for a stacked output AVR structure). In this case, the maximum output power increases with changes in coupling reactance. However, output power can be regulated to values below this level either by controlling the input voltage of the inverter, or through burst mode (on/off) control. When the AVR is controlled with $\theta_r=0°$, the rectifier switches turn on and off at zero current and even diodes can be used for simplicity. However, an AVR implementation with MOSFETs may allow for reduced conduction losses. In this case, by delaying the turn-on of the MOSFETs slightly relative to the zero crossing of the current, the switches achieve ZVS and near-ZCS switching, minimizing switching losses. The turn-on/off instant of the MOSFETs relative to current zero crossing (i.e., $\theta_r$) can be used as an additional control handle to extend the range of reactance variations that can be overcome by the AVR rectifier, as indicated by the upper curve in FIG. 4. Hence, a combination of voltage and phase control of the AVR can be used to compensate for large changes in coupling while maintaining high efficiency and power transfer capability.

In the example of FIG. 4, $V_1$ and $V_2$ are varied while holding their sum constant (a suitable choice for a stacked output AVR structure). In this case, the maximum output power increases with changes in coupling reactance. An alternative method of controlling the AVR rectifier can compensate for large variations in coupling reactance while maintaining constant output power. In this implementation, the input impedance of the AVR rectifier, $Z_r$ as given in (1), is controlled such that the imaginary part of this impedance compensates for changes in coupling reactance, while the real part remains constant, resulting in the output power being maintained at a fixed level even as the coupling varies. This is achieved by maintaining a specific relationship between the two output voltages of the AVR, $V_1$ and $V_2$ as shown in FIG. 3(b), given by the following:

$$V_2 = \sqrt{\frac{(1+k)G^2K_{inv}^2V_{IN}^2 \pm \sqrt{(1+k)^2G^4K_{inv}^4V_{IN}^4 - 16kP_{OUT}^2X^2}}{4K_{rec}}} - kV_1^2. \quad (2)$$

Figure 6:
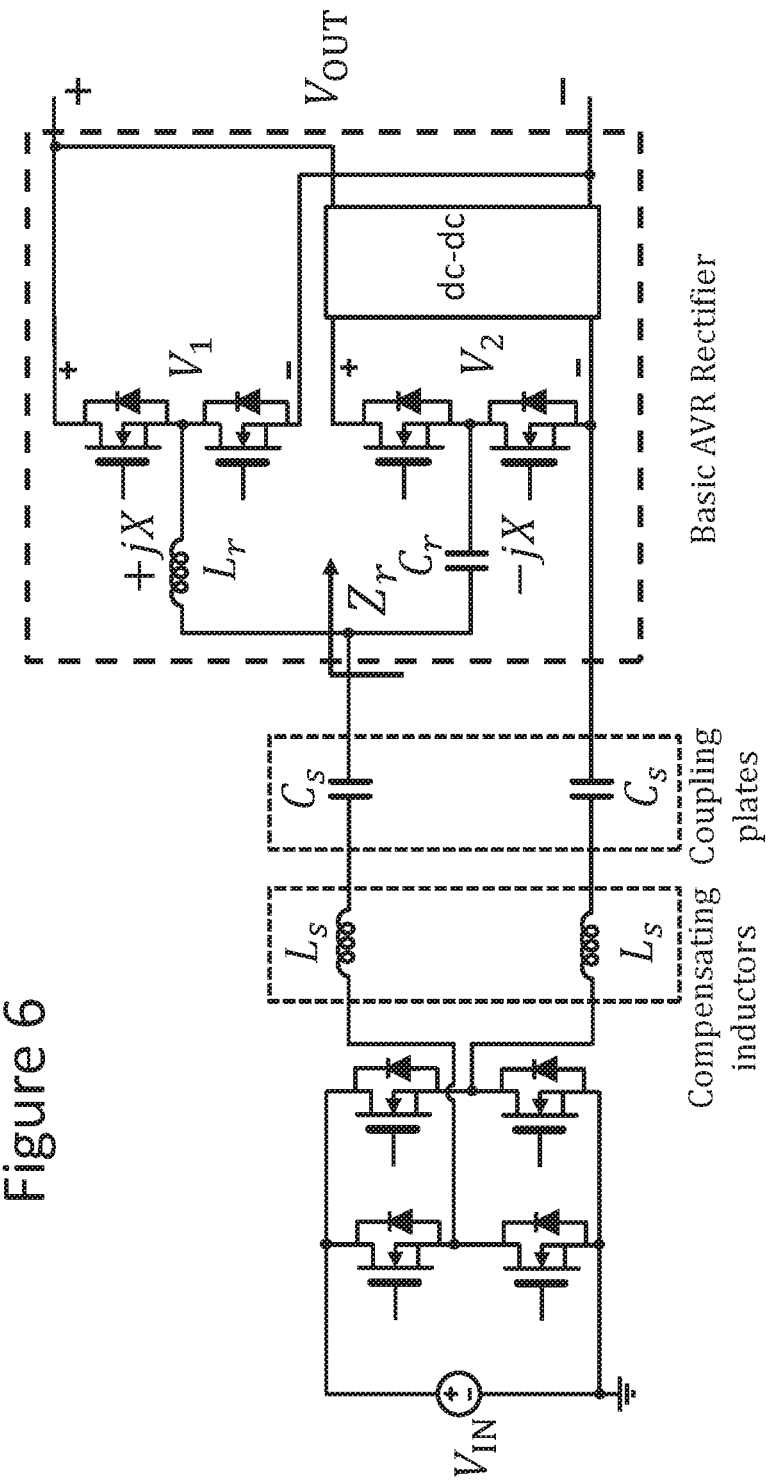
FIG. 6 depicts a schematic diagram of another example wireless power transfer system including another example implementation of an AVR rectifier circuit, according to one or more embodiments described and shown herein.

Here $V_{IN}$ and $P_{OUT}$ are the dc input voltage and the output power of the system, respectively, $K_{inv}$ is a gain associated with the high-frequency inverter (for instance, $$K_{inv} = \frac{2}{\pi}$$

inverter and $$\frac{4}{\pi}$$

for a full-bridge inverter), $K_{rec}$ is a gain associated with bridge rectifiers of the AVR $$\left(K_{rec} = \frac{2}{\pi^2}\right)$$

for the half-bridge rectifiers shown in FIG. 3(b)), G is the combined voltage gain of the matching networks and $$k = \frac{X + X_r}{X - X_r},$$

where X is the differential reactance of the AVR rectifier, and $X_r$ is the imaginary part of $Z_r$ that compensates for changes in coupling reactance. The relationship given in (2) can be satisfied by individually controlling $V_1$ and $V_2$ using two dc-dc converters, as shown in FIG. 3. An alternative approach is to connect one of the rectifier outputs directly to the system output (such as, $V_1=V_{OUT}$), and use a single dc-dc converter to interface the other rectifier output with the system output, as shown in FIG. 6. This eliminates one dc-dc converter from the WPT system, improving the system's efficiency and reducing its size and control complexity.

The maximum reactance $X_r$ (and hence the maximum compensation) that the AVR rectifier of FIG. 3(b) can provide is given by the following:

$$|X_r|_{max} = \frac{K_{inv}^2V_{IN}^2K_{rec} - 3K_{rec}^2V_{OUT}^2}{2K_{inv}^2V_{IN}^2K_{rec} - 5K_{rec}^2V_{OUT}^2} \frac{V_{OUT}}{P_{OUT}}\sqrt{2K_{inv}^2K_{rec}G^2V_{IN}^2 - 4V_{OUT}^2K_{rec}^2}. \quad (3)$$

Figure 7:
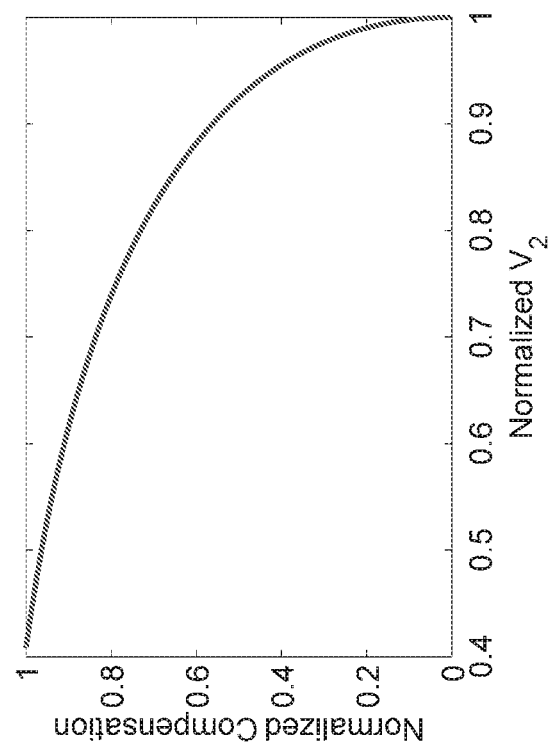
FIG. 7 depicts a graph showing compensation provided by an example AVR rectifier, normalized to a above maximum compensation limit, as a function of the output voltage of a bottom bridge rectifier $V_2$, normalized to the output voltage of the WPT system, $V_{OUT}$.
Figure 8:
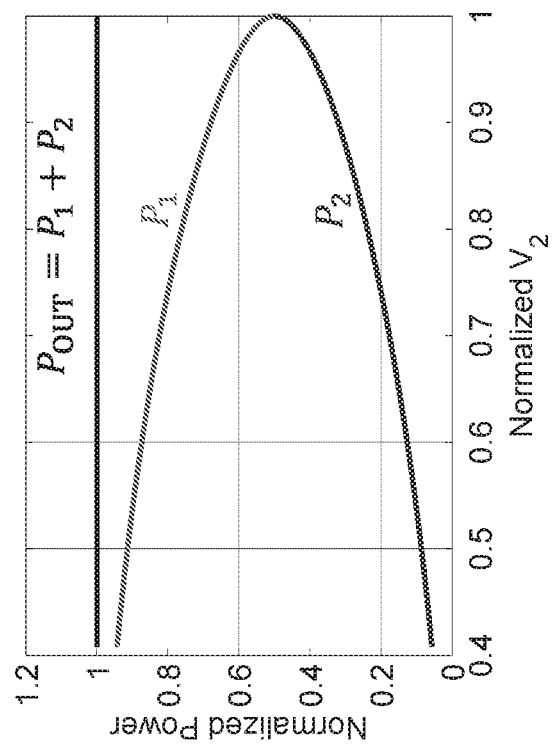
FIG. 8 depicts a graph showing the fractions of output power processed by the top and bottom bridge rectifiers of an example AVR rectifier circuit as $V_2$ is varied over the same range.

To illustrate the functionality of the AVR rectifier, consider the capacitive WPT system shown in FIG. 6. Under nominal operating conditions (that is, no misalignment between the transmitting and receiving sides), the capacitive reactance of the coupling plates (shown as $C_s$ in FIG. 6) is fully compensated by series inductors (shown as $L_s$). When there is a misalignment, the input voltage of the dc-dc converter is controlled according to (2), and the change in coupling is compensated while maintaining the output power level at its desired nominal value. In this particular example, the system is designed for a 65-W laptop charging application, with a 100-V dc input voltage and 20-V dc output voltage. FIG. 7 shows the compensation provided by the AVR rectifier, normalized to the above maximum compensation limit, as a function of the output voltage of the bottom bridge rectifier $V_2$, normalized to the output voltage of the WPT system, $V_{OUT}$. It can be seen that as the dc-dc converter of the AVR rectifier of FIG. 3(b) varies its input voltage $V_2$ from $V_{OUT}$ to $0.4V_{OUT}$ the AVR rectifier provides a continuously varying compensation up to its maximum limit. FIG. 8 shows the fractions of output power processed by the top and bottom bridge rectifiers as $V_2$ is varied over the same range.

It can be seen that the power processed by the top rectifier increases, while the power processed by the bottom rectifier decreases, in a manner that the sum of the two equals a constant output power $P_{OUT}$. This specific power splitting mechanism enables the AVR rectifier to compensate for coupling variations while maintaining the output power of the system at a fixed level.

Amplified-Reactance Active Variable Reactance Rectifier

Figure 9A:
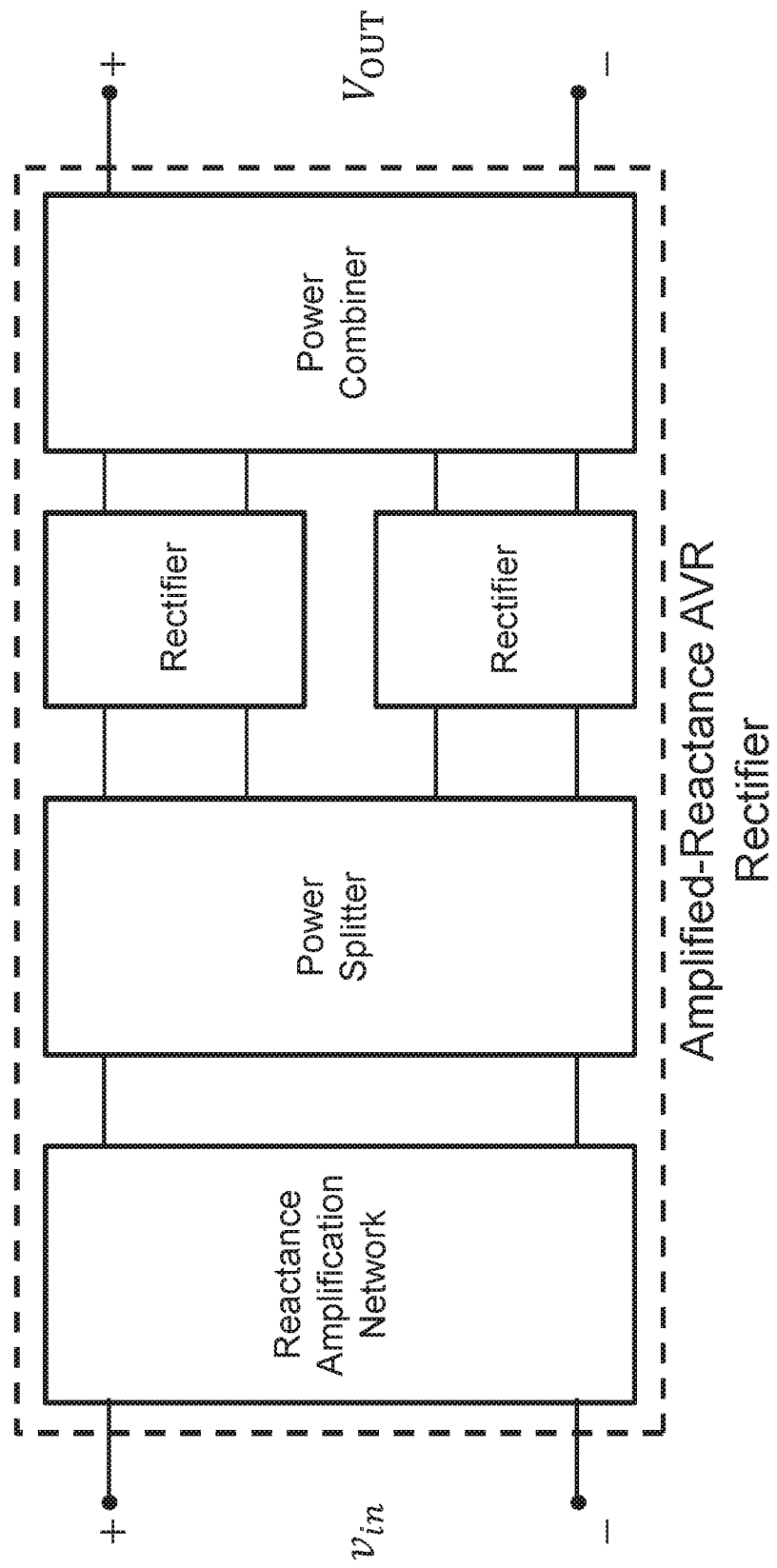
FIG. 9(a) depicts a schematic diagram of an amplified-reactance AVR rectifier, according to one or more embodiments described and shown herein.
Figure 9B:
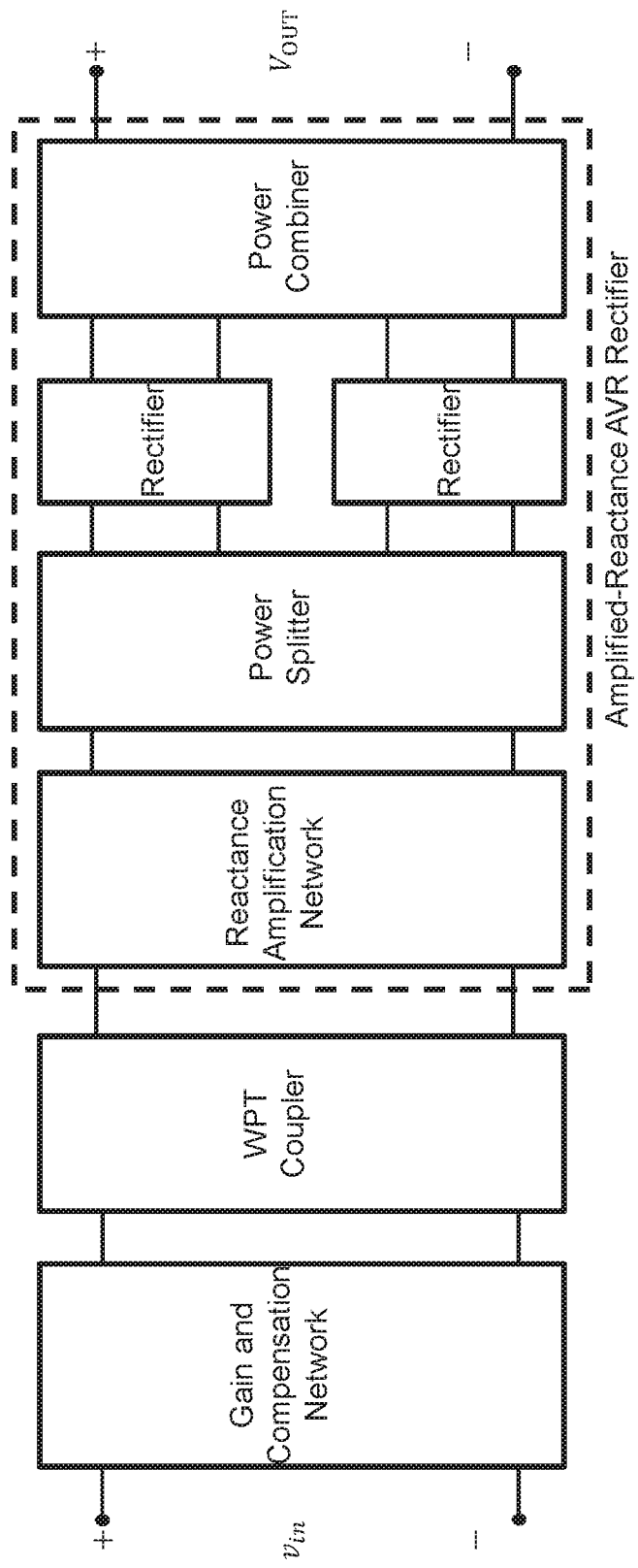
FIG. 9(b) depicts a schematic diagram of an example WPT system employing an example implementation of an amplified-reactance AVR rectifier, according to one or more embodiments described and shown herein.
Figure 11:
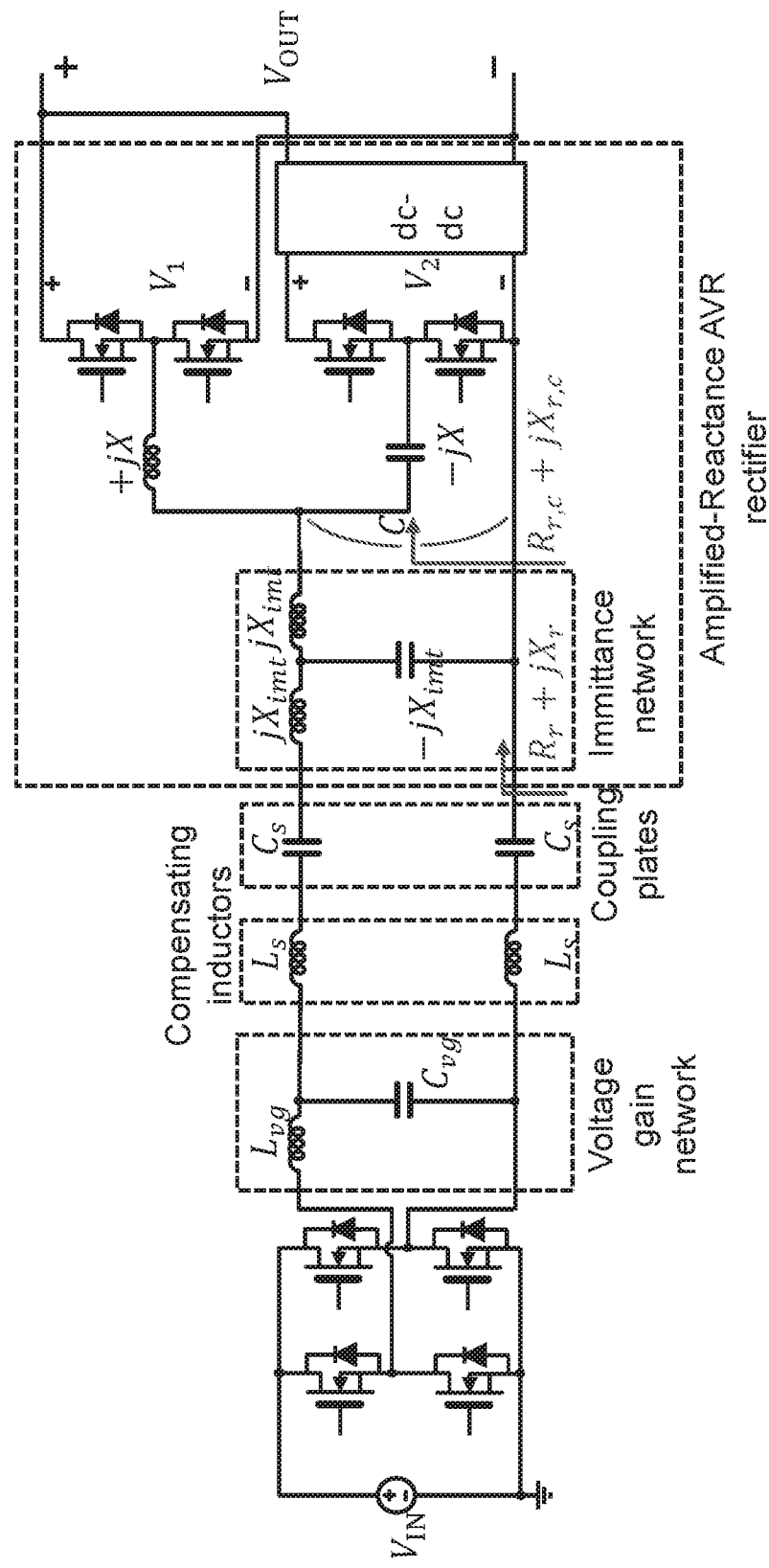
FIG. 11 depicts a schematic diagram of an example implementation of an amplified-reactance AVR rectifier in a capacitive WPT system, according to one or more embodiments described and shown herein.

An amplified-reactance AVR rectifier 100 can be used in applications where compensation is required for large variations in the coupling reactance of the WPT coupler. An example architecture of an amplified-reactance AVR rectifier 100 is shown in FIG. 9(a), similar to the amplified-reactance AVR rectifier 100 shown in FIG. 2. It comprises a reactance amplification network 110 whose output port is connected to the power splitting circuit 118 of the basic AVR rectifier 112. FIG. 9(b) shows an example WPT system employing the amplified-reactance AVR rectifier 100. This system also incorporates a gain and compensation network 104 connected to the primary side of the WPT coupler 106, which compensates for the reactance of the coupler when there is no coupler misalignment, and also helps maintain the required output power. To investigate the effectiveness of the amplified-reactance AVR rectifier 100 in the 65-W capacitive WPT application described above, the capacitive coupler of the system is designed using two pairs of 10 cm×10 cm coupling plates separated by a 2.5-mm air-gap, and one of these pairs is shown in FIG. 10(a). Finite-element simulations are performed in Ansys Maxwell to estimate the change in coupling reactance when the transmitting and the receiving sides of this coupler are misaligned by up to 50%, as shown in FIG. 10(b). As can be seen from FIG. 10(c), this misalignment changes the coupling reactance by up to about 1000Ω. The amplified-reactance AVR rectifier 100 is used in this application to compensate for the coupling variation. One example implementation of the amplified-reactance AVR rectifier 100 in a capacitive WPT system is shown in FIG. 11. In this particular implementation, the system utilizes an immittance network 210 as a reactance amplification network, and an L-section voltage gain network 203 along with compensating inductors 204 as its gain and compensation network. The immittance network 210 comprises three reactive elements—two series inductors having an impedance $+jX_{imt}$ and a shunt capacitor having equal but opposite impedance $-jX_{imt}$ at the operating frequency of the capacitive WPT system. Those skilled in the art will appreciate that other implementations of the immittance network may also be employed as the reactance amplification network of the AVR rectifier. These alternate implementations include a three-element immittance network with two series capacitors having impedances $-jX_{imt}$ and a shunt inductor having equal but opposite impedance $+jX_{imt}$, as well as other implementations with a larger number of reactive elements.

The input impedance of the amplified-reactance AVR rectifier of FIG. 11, now measured at the input of the immittance network, is given by the following:

$$Z_r = R_r + jX_r = \frac{X_{imt}^2}{R_{r,c}^2 + X_{r,c}^2} R_{r,c} + j\left(-\frac{X_{imt}^2}{R_{r,c}^2 + X_{r,c}^2} X_{r,c}\right). \quad (4)$$

Figure 12B:
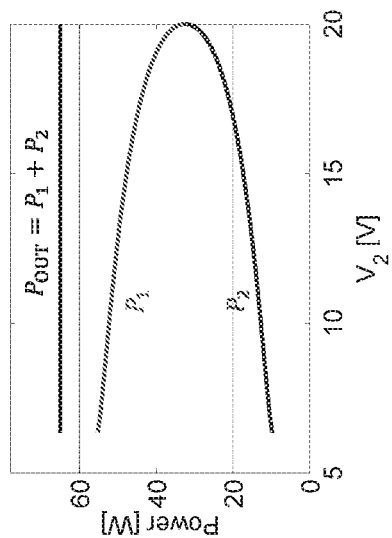
FIGS. 12(a) and 12(b) depict graphs showing compensation provided by an AVR rectifier circuit.
Figure 12A:
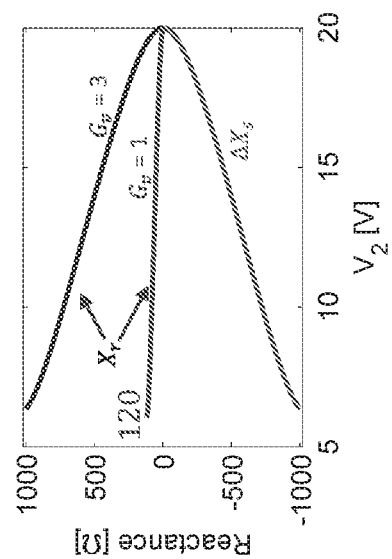

Here, $R_{r,c}$ and $X_{r,c}$ are the real and imaginary parts of the impedance looking into port C, as shown in FIG. 11. As before, when a misalignment occurs, the output voltage of the bottom leg of the AVR, $V_2$, is modified using the dc-dc converter such that the real part of the AVR input impedance $R_r$, given in (4), remains constant, while the imaginary part $X_r$, also given in (4), compensates for the change in coupling reactance. This impedance transformation by the immittance network enables the maximum compensation limit of this AVR rectifier to be given by the following:

$$|X_r|_{max} = \frac{K_{inv}^2 V_{IN}^2 G_v^2}{2P_{OUT}}, \quad (5)$$

where $G_v$ (>1) is the voltage gain provided by the L-section voltage gain network. As can be seen, the maximum compensation can now be increased by appropriately selecting the voltage gain $G_v$. The compensation provided by this AVR rectifier for the 65-W capacitive WPT application discussed above is shown in FIGS. 12(a) and 12(b), for voltage gains $G_v$ of 1 and 3. It can be seen that even with a voltage gain $G_v$ of 1 (that is, with no L-section network), this amplified-reactance AVR rectifier is able to compensate for 120Ω of coupling variation—an order of magnitude higher than the maximum compensation provided by the basic AVR rectifier. With a voltage gain $G_v$ of 3, the amplified-reactance AVR rectifier is able to fully compensate for the required 1000Ω of coupling variation (corresponding to 50% misalignment). Higher levels of compensation can be provided by designing the L-section matching network to provide higher voltage gains, in which case multistage L-section networks may be preferable.

The amplified-reactance AVR rectifier of FIG. 11 can be designed as follows. Given the dc input voltage $V_{IN}$ and required output power $R_{OUT}$, the required voltage gain of the L-section matching network is computed by equating the above expression for the maximum compensation limit of the amplified-reactance AVR rectifier, $|X_r|_{max}$, to the required maximum compensation $|\Delta X_s|_{max}$, as the following:

$$G_v = \frac{\pi}{2\sqrt{2}\, V_{IN}} \sqrt{P_{OUT}|\Delta X_s|_{max}}. \quad (6)$$

The output power of the capacitive WPT system of FIG. 10 can be expressed as the following:

$$P_{OUT} = \frac{4}{\pi^2} \frac{V_{OUT}}{X} \frac{1}{\sqrt{\frac{1}{(G_v V_{IN})^2}\left(\frac{X}{X_{imt}}\right)^2 - \frac{1}{V_{OUT}^2}}}. \quad (7)$$

The values of the AVR differential reactance X and immittance network reactance $X_{imt}$ can be selected to satisfy the output power requirement using this expression. Various values of the differential reactance of the AVR rectifier X and the immittance network reactance $X_{imt}$ can satisfy this output power expression. However, to provide the same range of compensation, each combination of X and $X_{imt}$ requires a different range of variation in the output voltage of the bottom bridge rectifier, $V_2$. The values of X and $X_{imt}$ are selected such that the required variation in $V_2$ is minimized, compressing the operating range of the dc-dc converter of the AVR rectifier and enabling it to be designed more efficiently. The inductance and capacitance values for the immittance network and the differential branches of the AVR rectifier can be determined from $X_{imt}$ and X, respectively, as:

$$L_{imt} = \frac{X_{imt}}{2\pi f_s}, \ C_{imt} = \frac{1}{2\pi f_s X_{imt}}, \ L_r = \frac{X}{2\pi f_s} \ \text{and} \ C_r = \frac{1}{2\pi f_s X},$$

where $f_s$ is the operating frequency of the system.

Prototype Design and Experimental Results

Figure 13:
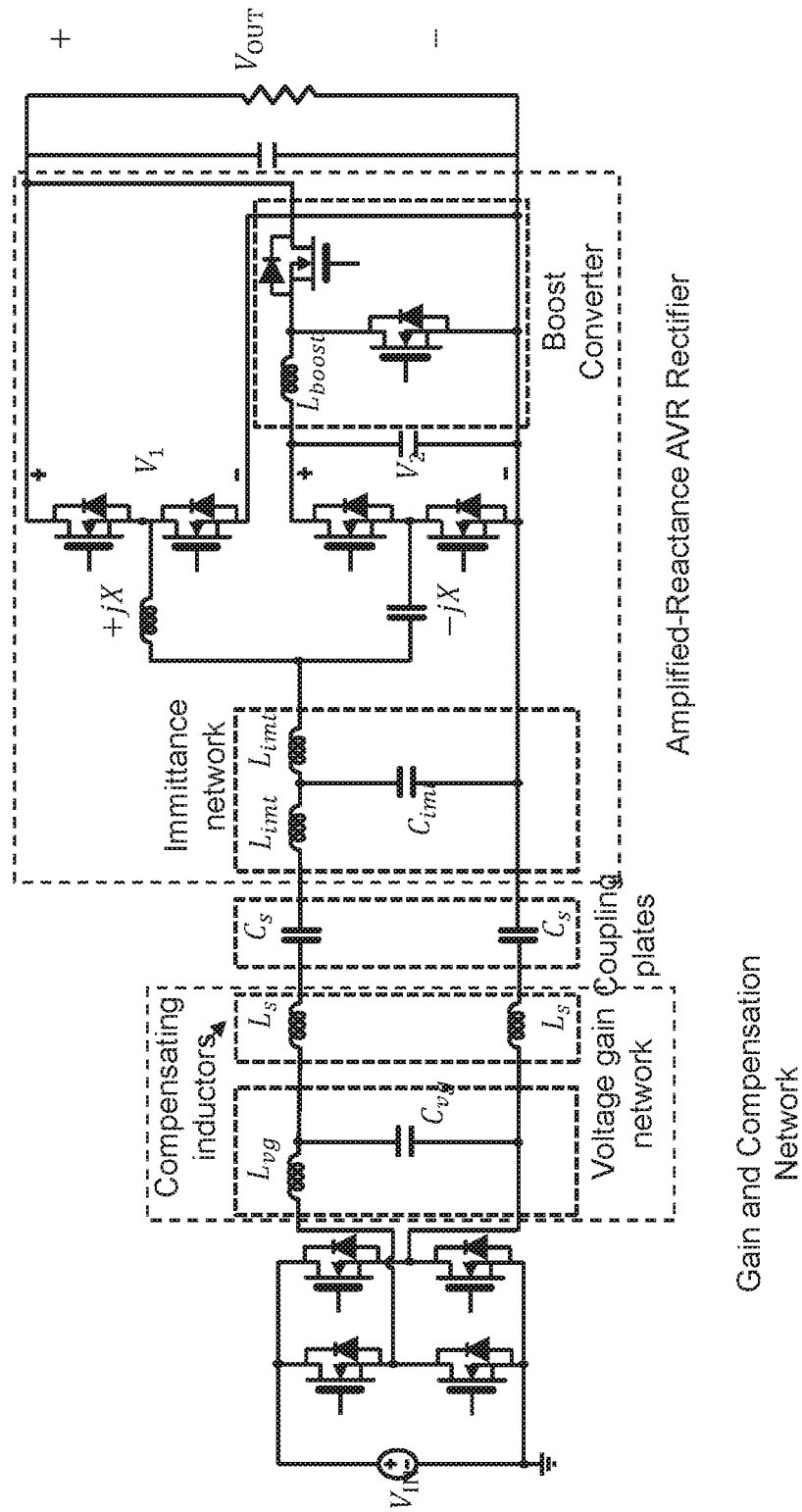
FIG. 13 depicts a schematic diagram of an example implementation of an amplified-reactance AVR rectifier, according to one or more embodiments described and shown herein.

A prototype capacitive WPT system with the amplified-reactance AVR rectifier of FIG. 10 is designed, built and tested for a 6.78-MHz 65-W laptop charging application with 100-V dc input voltage and 20-V dc output voltage. A schematic diagram the prototype circuit is shown in FIG. 13. The capacitive coupler in this system is implemented using two pairs of 10 cm×10 cm plates separated by a 2.5-mm air-gap. The full-bridge inverter in this system is realized using GS66502B enhancement-mode GaN transistors, while the half-bridge rectifiers of the AVR are implemented using EPC2015C enhancement-mode GaN transistors. The dc-dc converter of the AVR rectifier is implemented as a boost converter, using EPC2020 GaN transistors. The inductors in the prototype system are realized using single-layer air-core solenoids, and the resonant capacitors are implemented using low-ESR NP0 ceramic capacitors. Table I lists the values of all the reactive components used in this prototype. When the coupling plates are perfectly aligned, the output

TABLE I

COMPONENTS USED IN THE DESIGN OF THE 6.78-MHZ 65-W CAPACITIVE WPT SYSTEM FOR LAPTOP CHARGING APPLICATION

Figure 14A:
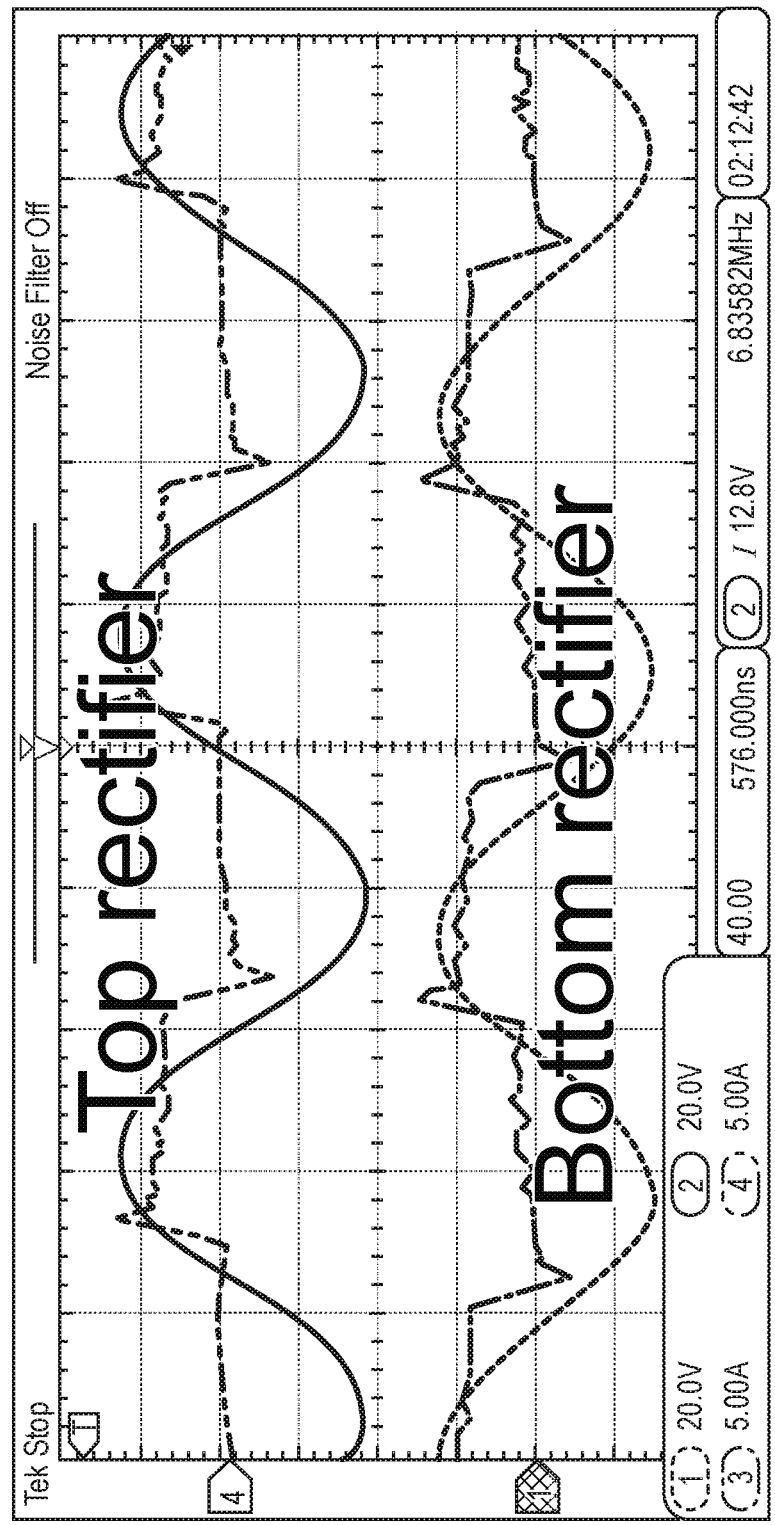
FIGS. 14(a) through 14(b) depict graphs showing waveforms of measured switch-node voltages and input currents of an example AVR rectifier circuit.
Figure 14B:
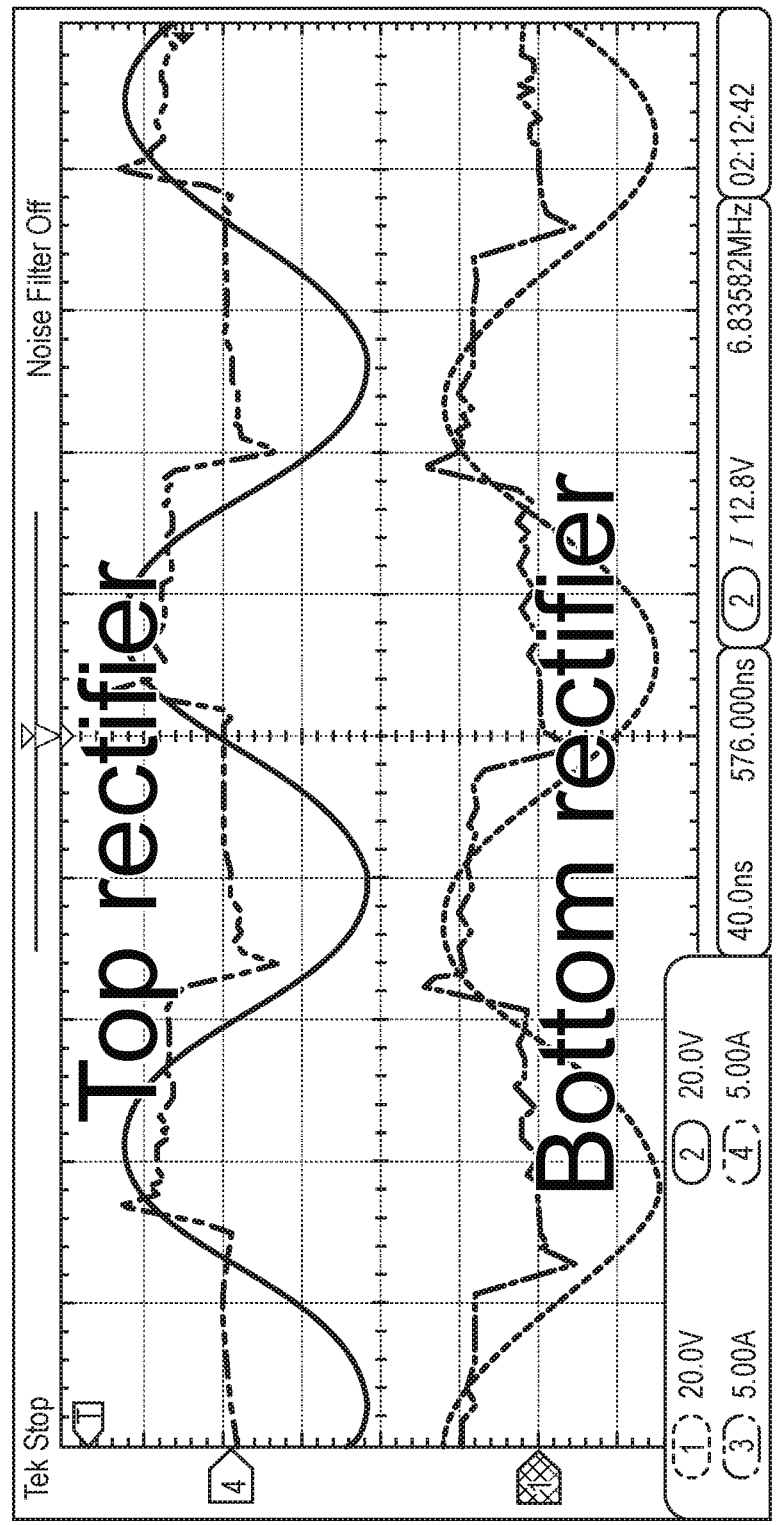
Figure 14C:
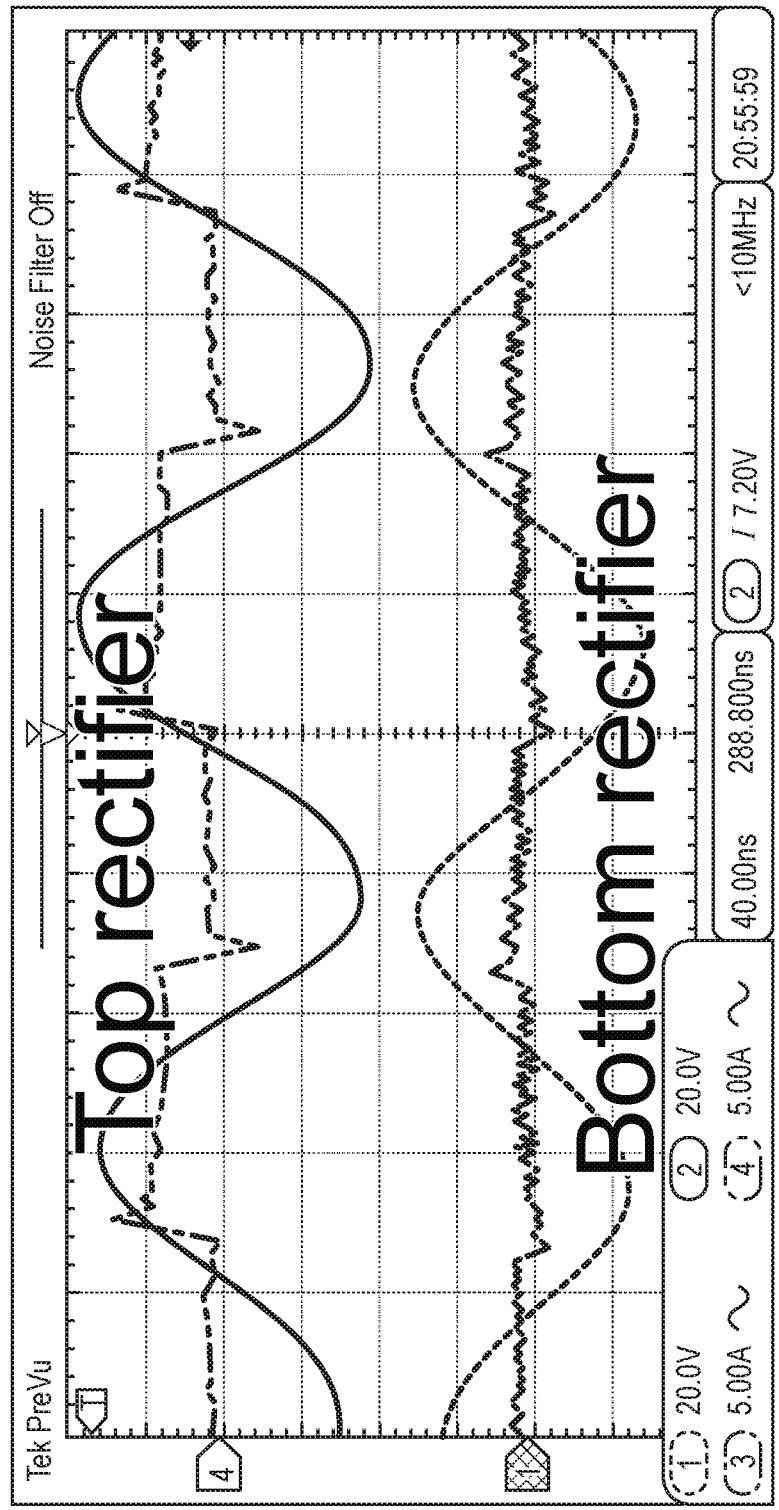

| $L_{vg}$ | $C_{vg}$ | $L_s$ | $L_{imt} = \frac{X_{imt}}{2\pi f_s}$ | $C_{imt} = \frac{1}{2\pi f_s X_{imt}}$ | $L_r = \frac{X}{2\pi f_s}$ | $C_r = \frac{1}{2\pi f_s X}$ |
|---|---|---|---|---|---|---|
| 8.27 µH | 59.2 pF | 14.3 µH | 3.29 µH | 167.6 pF | 204 nH | 2.7 nF | voltages of the two bridge rectifiers are maintained at 20 V, and the prototype system transfers 65 W of power at 84% efficiency. Waveforms of the measured switch-node voltages and input currents of the two bridge rectifiers under this operating condition are shown in FIG. 14(a). It can be seen that the rectifier transistors achieve zero-voltage switching and near-zero-current switching. When the coupling plates are laterally misaligned by 50% in the direction shown in FIG. 10(b), the output power falls to 53 W, and the corresponding rectifier waveforms are shown in FIG. 14(b). As can be seen, the rectifier switch-node voltages and input currents are phase shifted more with respect to one another, resulting in lower output power. To compensate for the change in coupling reactance, the output voltage of the bottom bridge rectifier is modified from 20 V to 7 V in accordance with the required relationship between the two output voltages of the AVR rectifier as specified in (2). The resultant rectifier waveforms are shown in FIG. 14(c). As a result the power transfer is restored to 65 W with 83.4% efficiency.

There are many possible implementations of AVR rectifiers, including different ways to realize the function of the dc-dc converters. These include various soft-switching magnetic, switched capacitor and hybrid converter approaches to power combining at the output of the rectifiers. The AVR rectifiers can also be used in combination with impedance control network (ICN) based inverters, which can operate efficiently across changes in input voltages. Also AVR structures can simultaneously compress load changes. Furthermore, the multiple inductors of the AVR can be combined into a single magnetic structure. For example, two coupled windings can realize the inductances of the AVR and an inductance in the compensation and matching network of FIG. 3. Analysis has shown that compared to the case when the inductors are implemented separately, the integrated magnetic structure results in significant reduction in size and losses.

Some implementations of the active variable reactance (AVR) rectifiers and associated controls allow zero voltage switching and near zero current switching (or pure zero current switching) over a wide operating range and hence enable very high efficiency to be achieved. In these implementations, the rectifiers and associated controls allow WPT systems to operate efficiently at fixed high-frequencies or over a relatively narrow band of frequencies, while attaining tolerance to variations in coupling; hence, reducing size and losses, and staying in compliance with FCC regulations.

Example Variants

Figure 15:
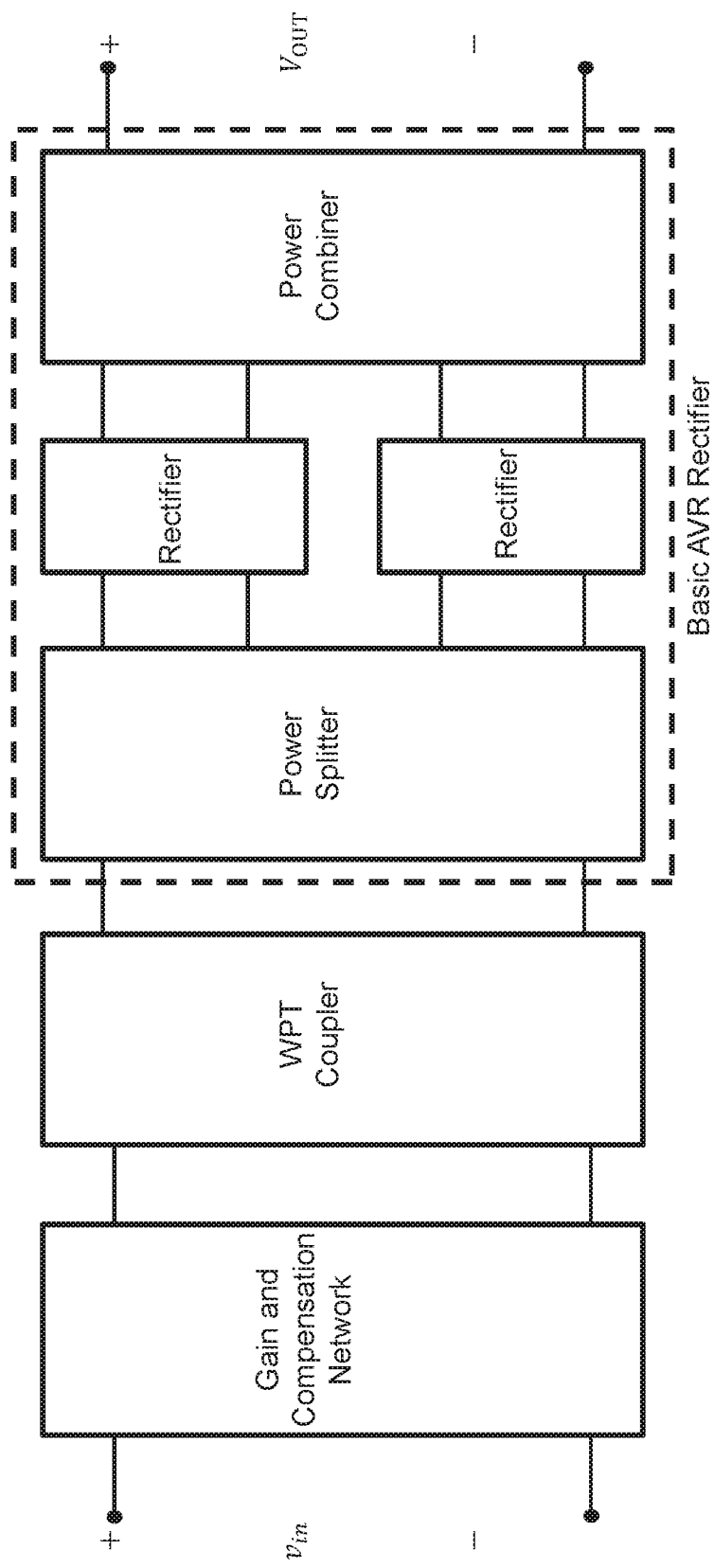
FIG. 15 depicts a schematic diagram of an example wireless power transfer system including an example implementation of an AVR rectifier circuit, according to one or more embodiments described and shown herein.
Figure 16:
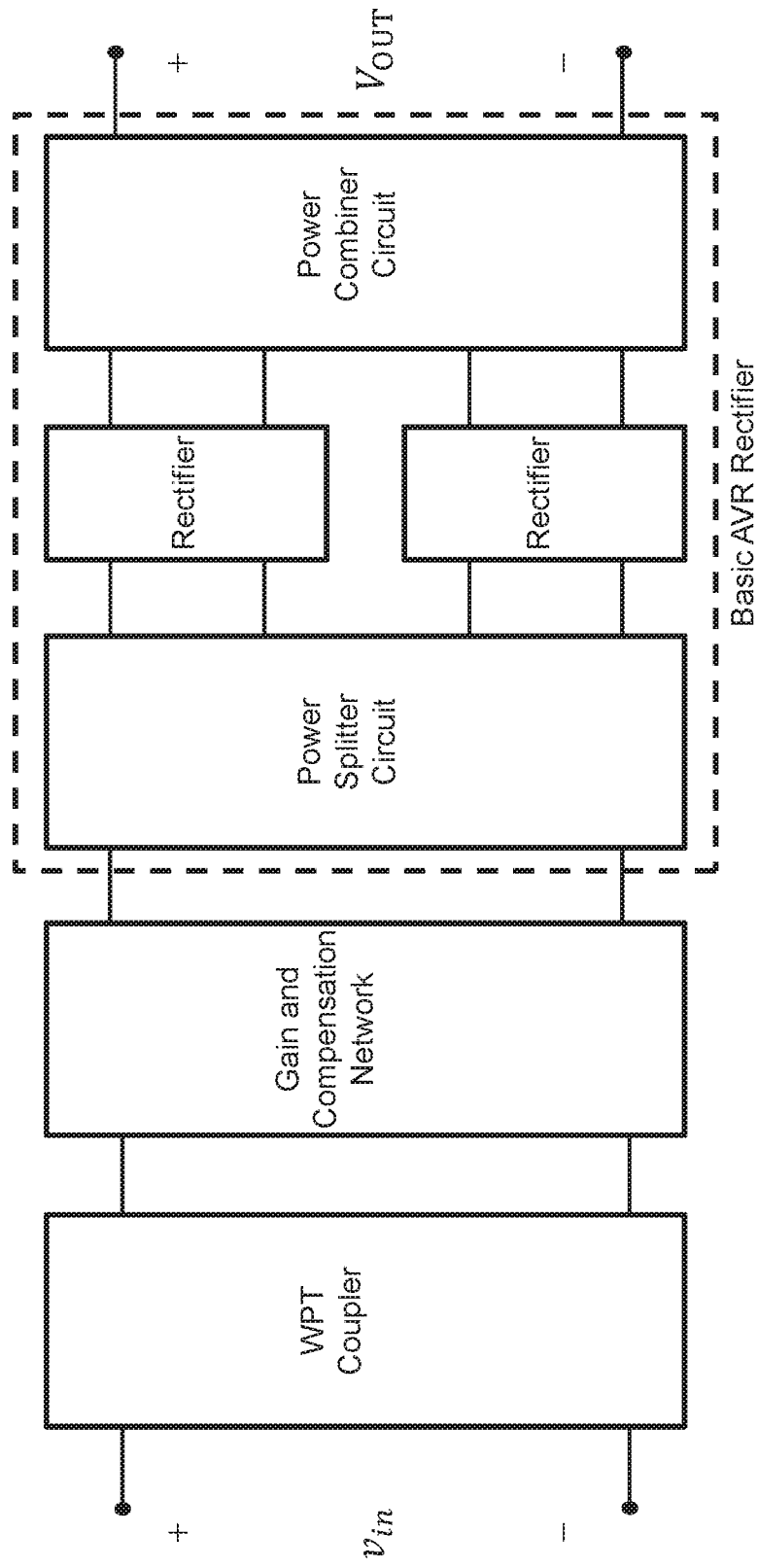
FIG. 16 depicts a schematic diagram of an example wireless power transfer system including an example implementation of an AVR rectifier circuit, according to one or more embodiments described and shown herein.
Figure 17:
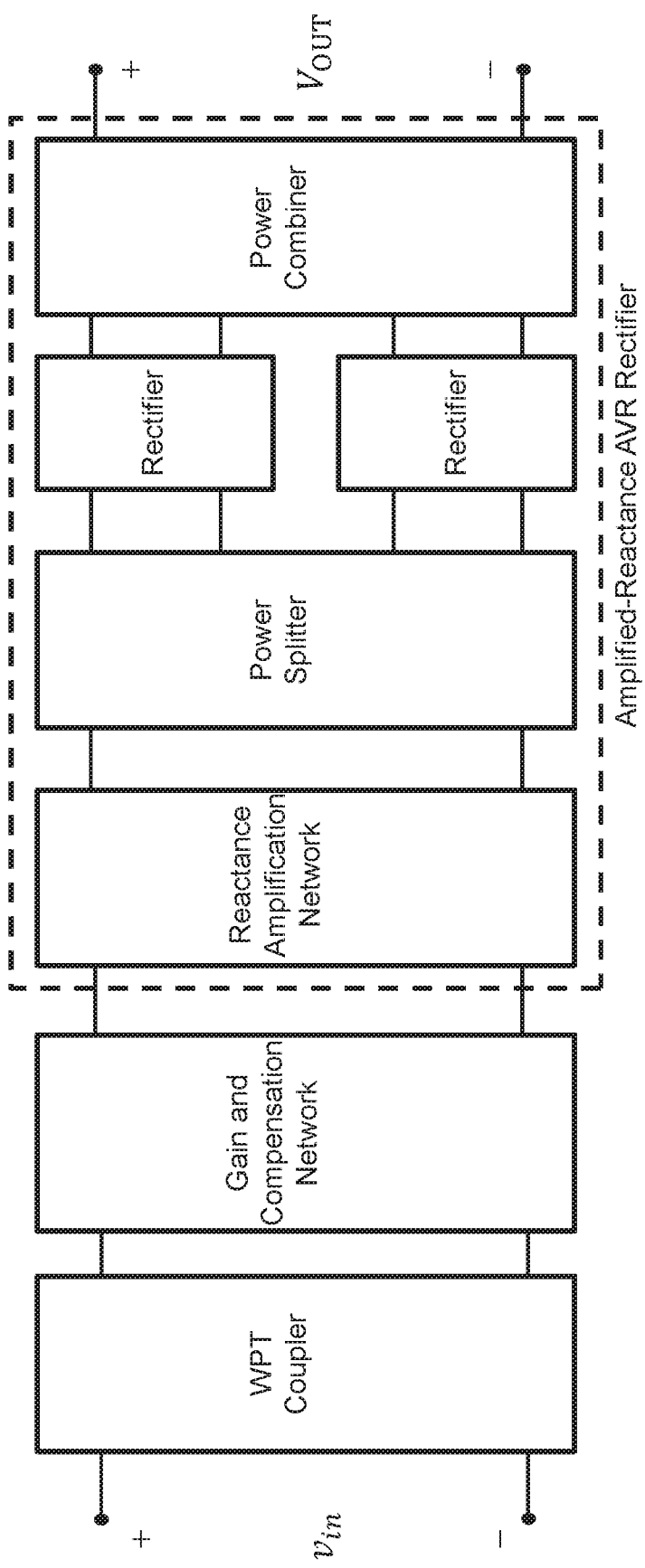
FIG. 17 depicts a schematic diagram of an example wireless power transfer system including an example implementation of an amplified-reactance AVR rectifier circuit, according to one or more embodiments described and shown herein.
Figure 18:
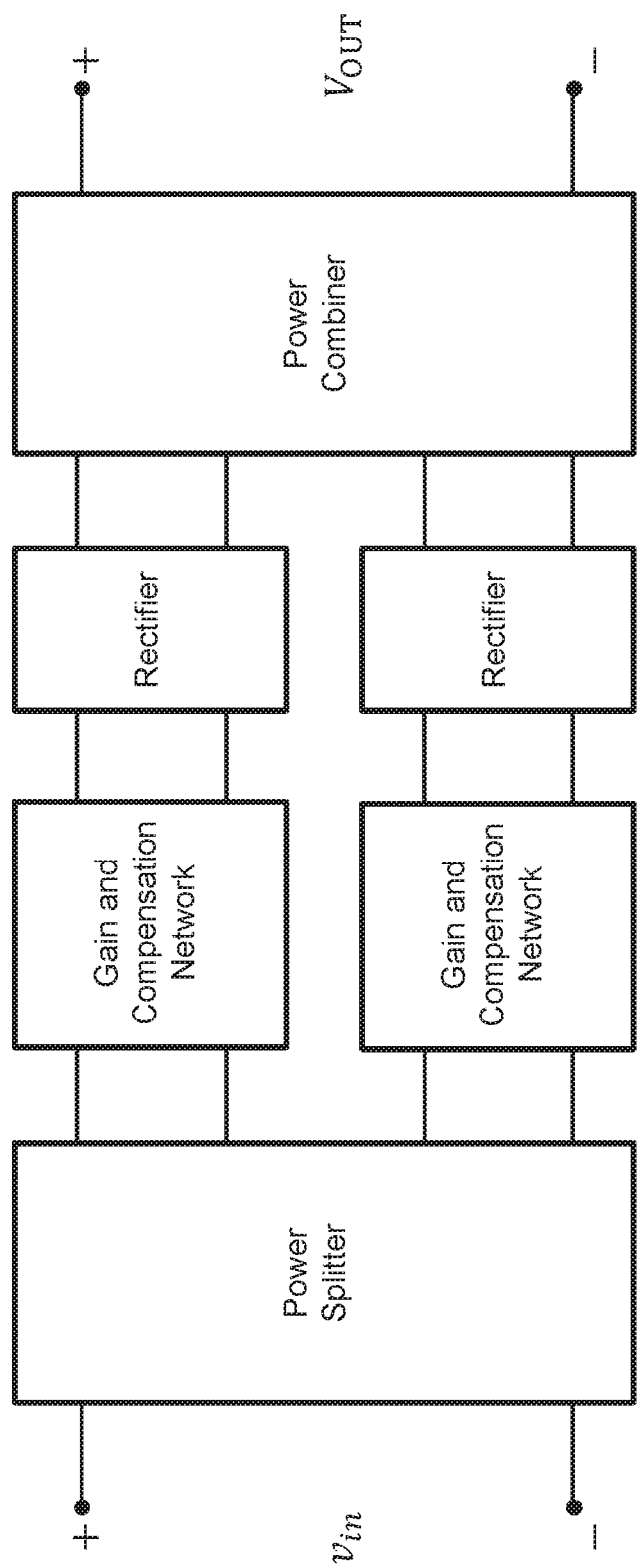
FIG. 18 depicts a schematic diagram of an example implementation of an AVR rectifier circuit, according to one or more embodiments described and shown herein.
Figure 19:
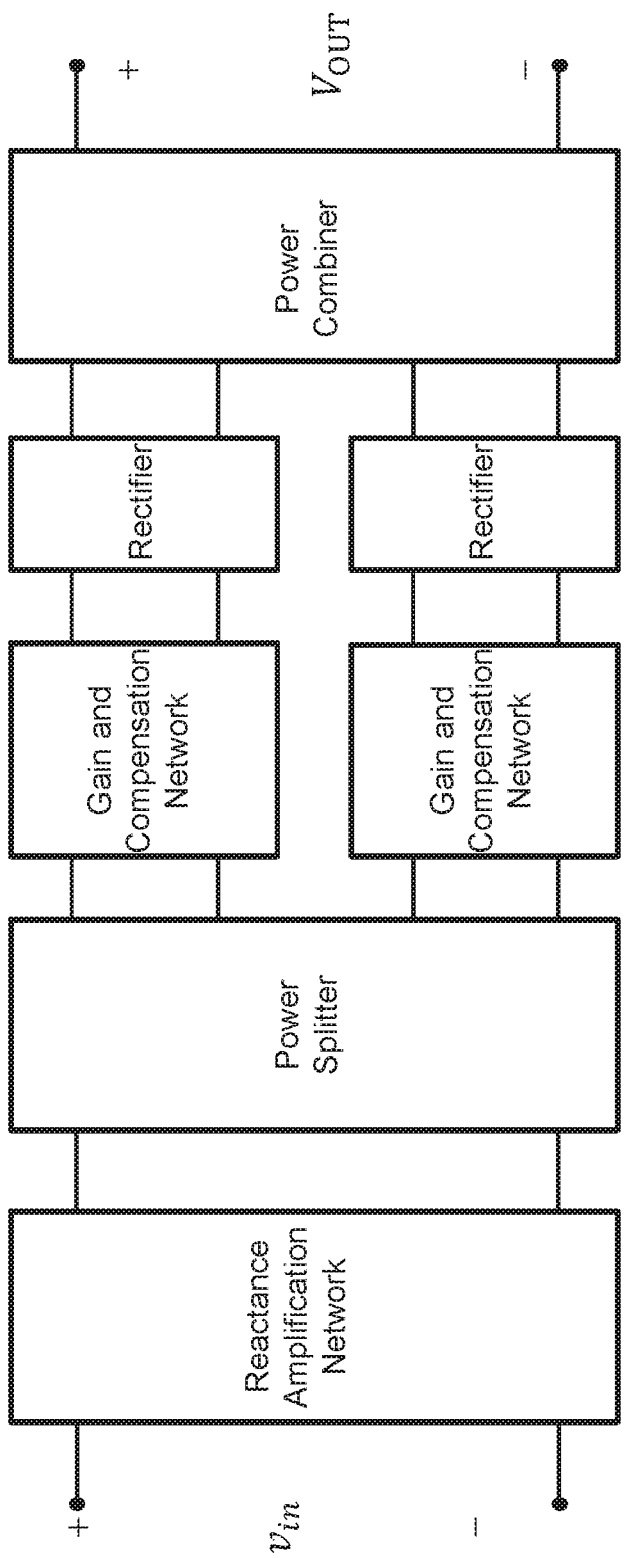
FIG. 19 depicts a schematic diagram of an example implementation of an amplified-reactance AVR rectifier circuit, according to one or more embodiments described and shown herein.

The Active Variable Reactance (AVR) rectifiers described above are merely examples of many possible embodiments of an AVR rectifier. A number of additional example embodiments of the AVR rectifier are also provided as follows.

a) Basic AVR Rectifier with Gain Compensation Network on Primary Side of Coupler In one implementation, for example, a basic AVR rectifier may be provided with a gain and compensation network on the primary side of the WPT coupler, as illustrated in FIG. 15. In this implementation, for example, the gain and compensation network is coupled to the input port of the WPT system to receive an ac input voltage $v_{in}$. The WPT coupler is coupled between the gain and compensation network and the basic AVR rectifier, which is in turn coupled to an output port to provide a dc output voltage $V_{OUT}$.

b) Basic AVR Rectifier with Gain and Compensation Network on Secondary Side of Coupler In yet another implementation, an amplified-reactance AVR rectifier may be provided with a gain and compensation network on the secondary side of the WPT coupler, as illustrated in FIG. 17.

c) Amplified-Reactance AVR Rectifier with Gain and Compensation Network on Secondary Side of Coupler In yet another implementation, an amplified-reactance AVR rectifier may be provided with a gain and compensation network on the secondary side of the WPT coupler, as illustrated in FIG. 17.

d) Basic AVR Rectifier with Gain and Compensation Networks Following Power Splitter In another implementation, a basic AVR rectifier may be provided in which gain and compensation networks are connected to the outputs of the power splitter, as illustrated in FIG. 18.

e) Amplified-Reactance AVR Rectifier with Gain and Compensation Networks Following Power Splitter In another implementation, an amplified-reactance AVR rectifier may be provided in which gain and compensation networks are connected to the outputs of the power splitter, as illustrated in FIG. 19.

f) AVR Rectifier with Parallel and Series-Connected Dc-Dc Converters

Figure 20A:
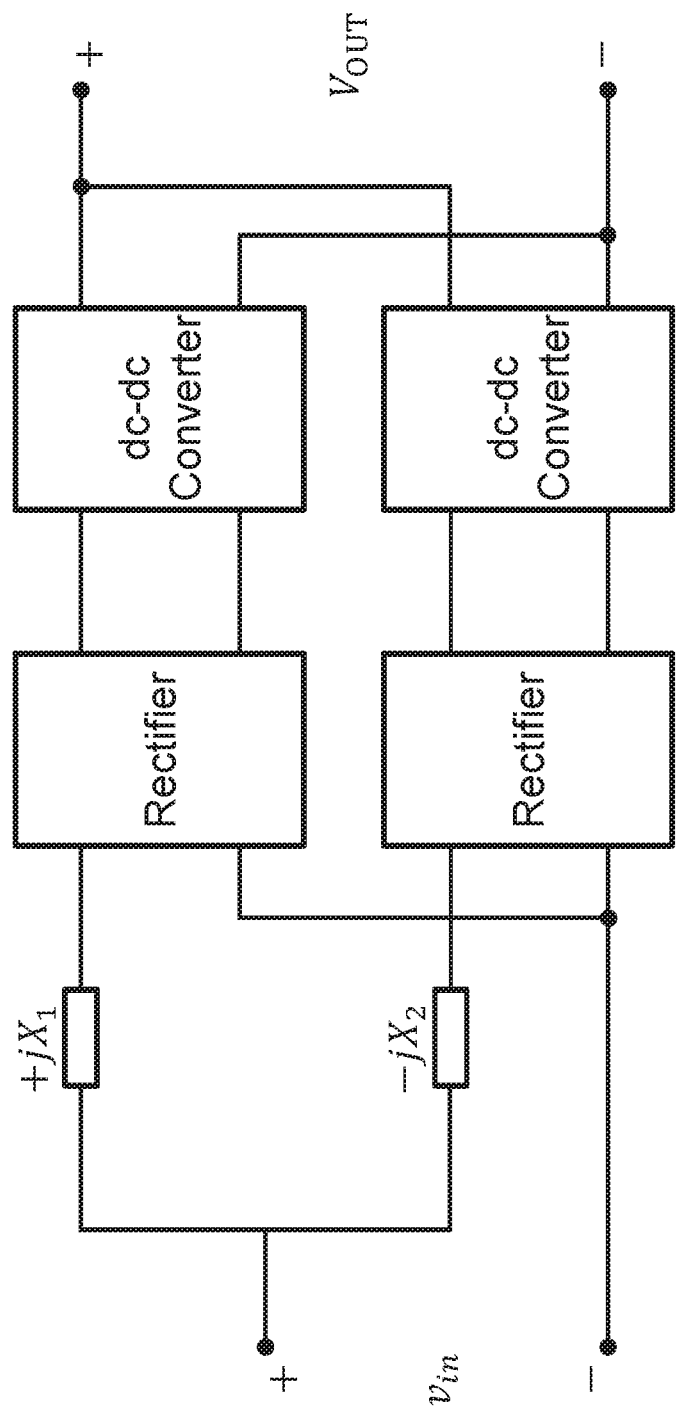
FIGS. 20(a) and 20(b) depict schematic diagrams of example implementations of AVR rectifier circuits, according to one or more embodiments described and shown herein.
Figure 20B:
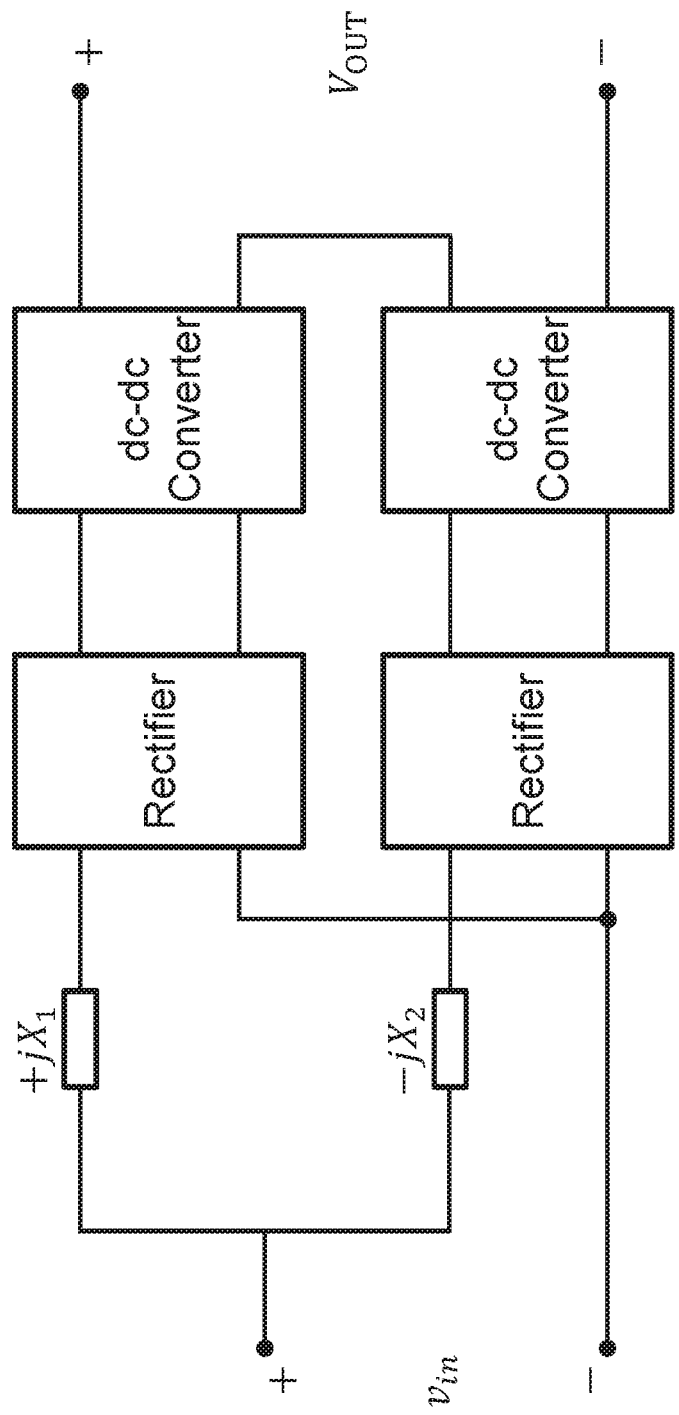

In another implementation, for example, an AVR rectifier may be provided with the outputs of the dc-dc converters of the power combiner either connected in parallel, as illustrated in FIG. 20(a), or connected in series, as illustrated in FIG. 20(b).

g) AVR Rectifier with Coupled Integrated Magnetics

Figure 21A:
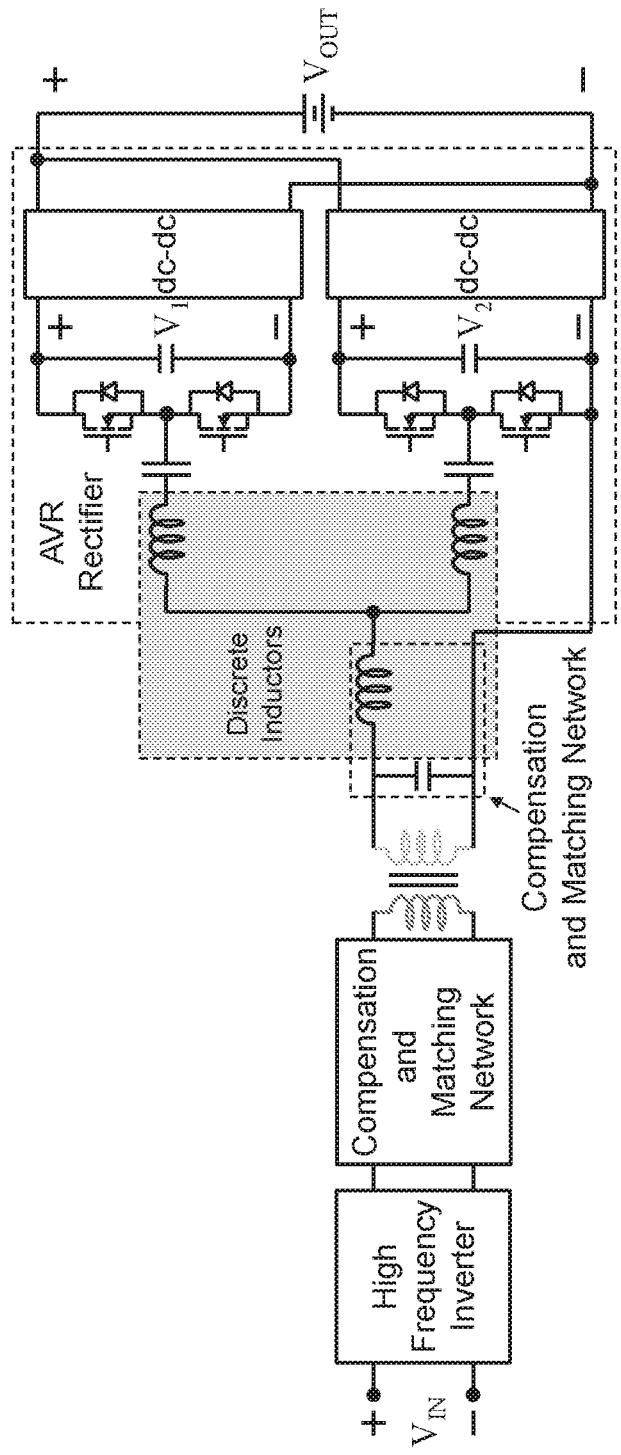
FIGS. 21(a) and 21(b) depict schematic diagrams of an example wireless power transfer systems including example implementations of AVR rectifier circuits, according to one or more embodiments described and shown herein.
Figure 21B:
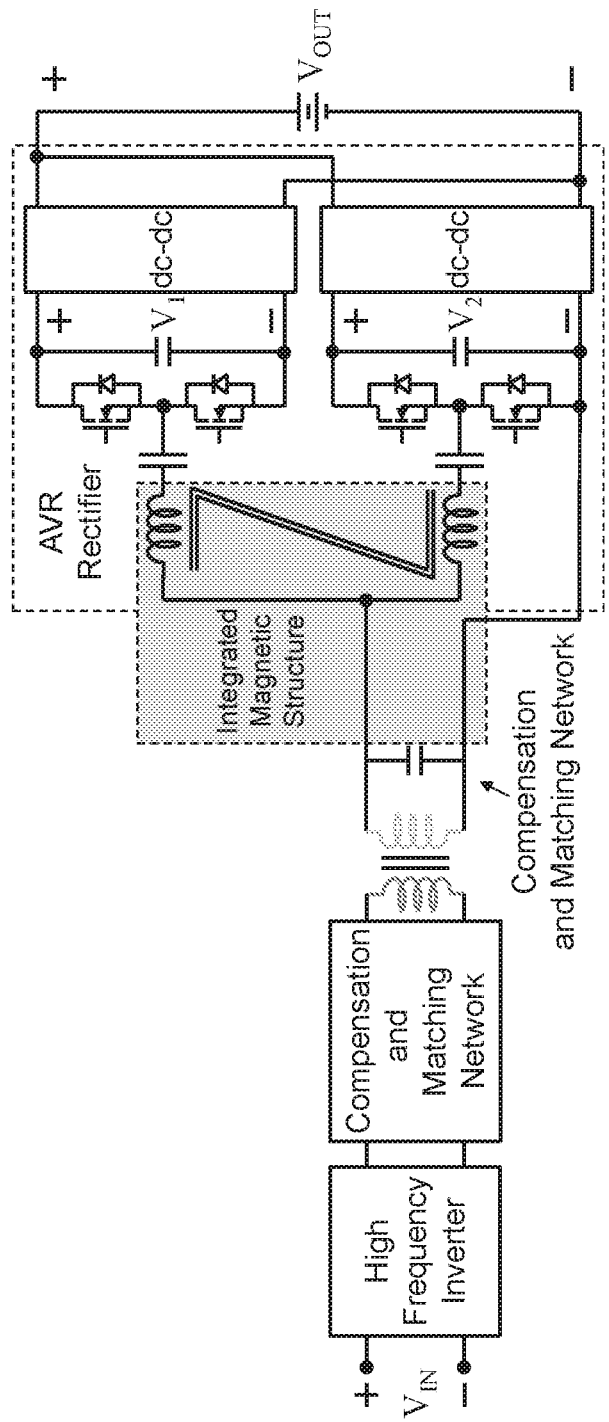
Figure 22:
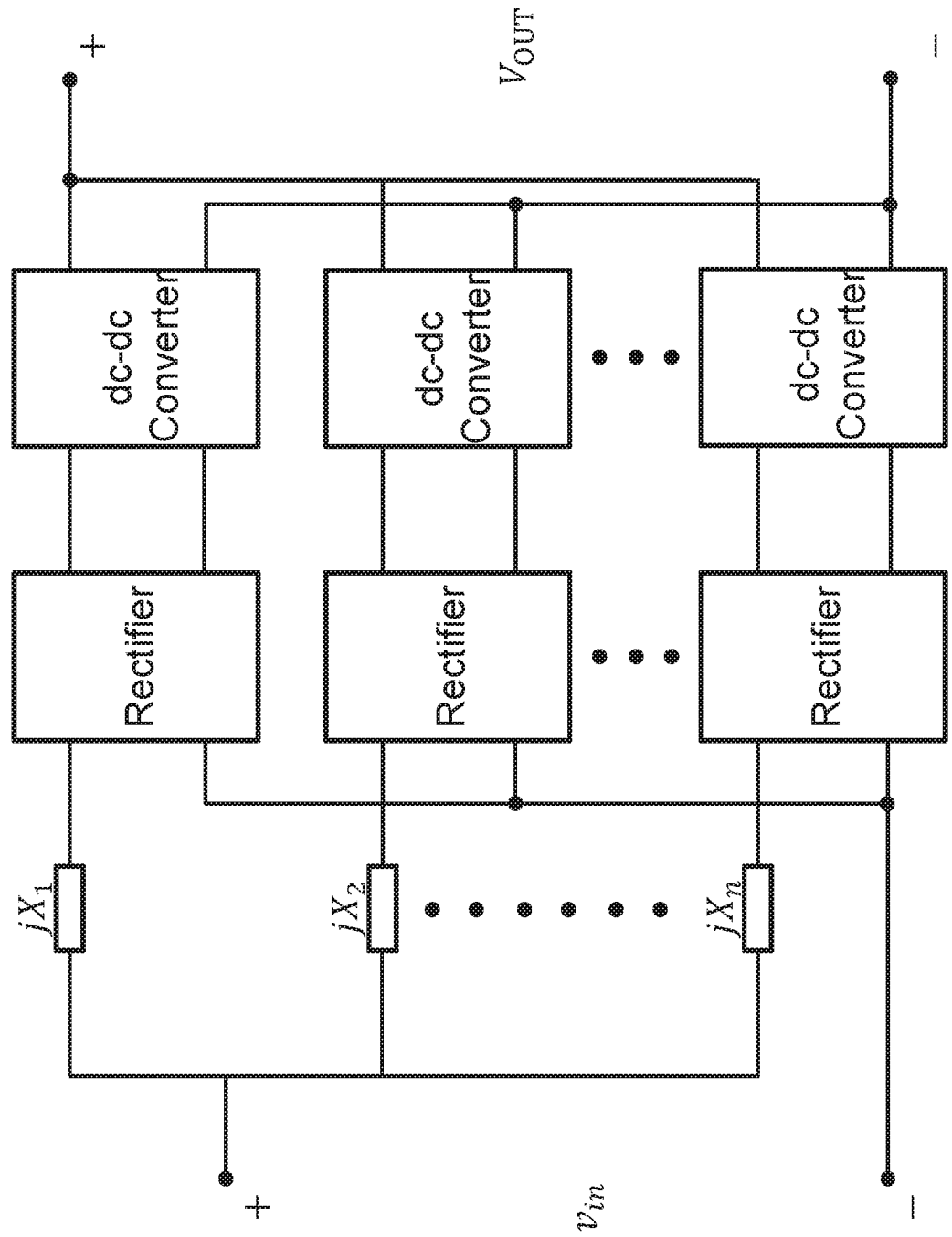
FIG. 22 depicts a schematic diagram of an example implementation of an AVR rectifier circuit, according to one or more embodiments described and shown herein.
Figure 23:
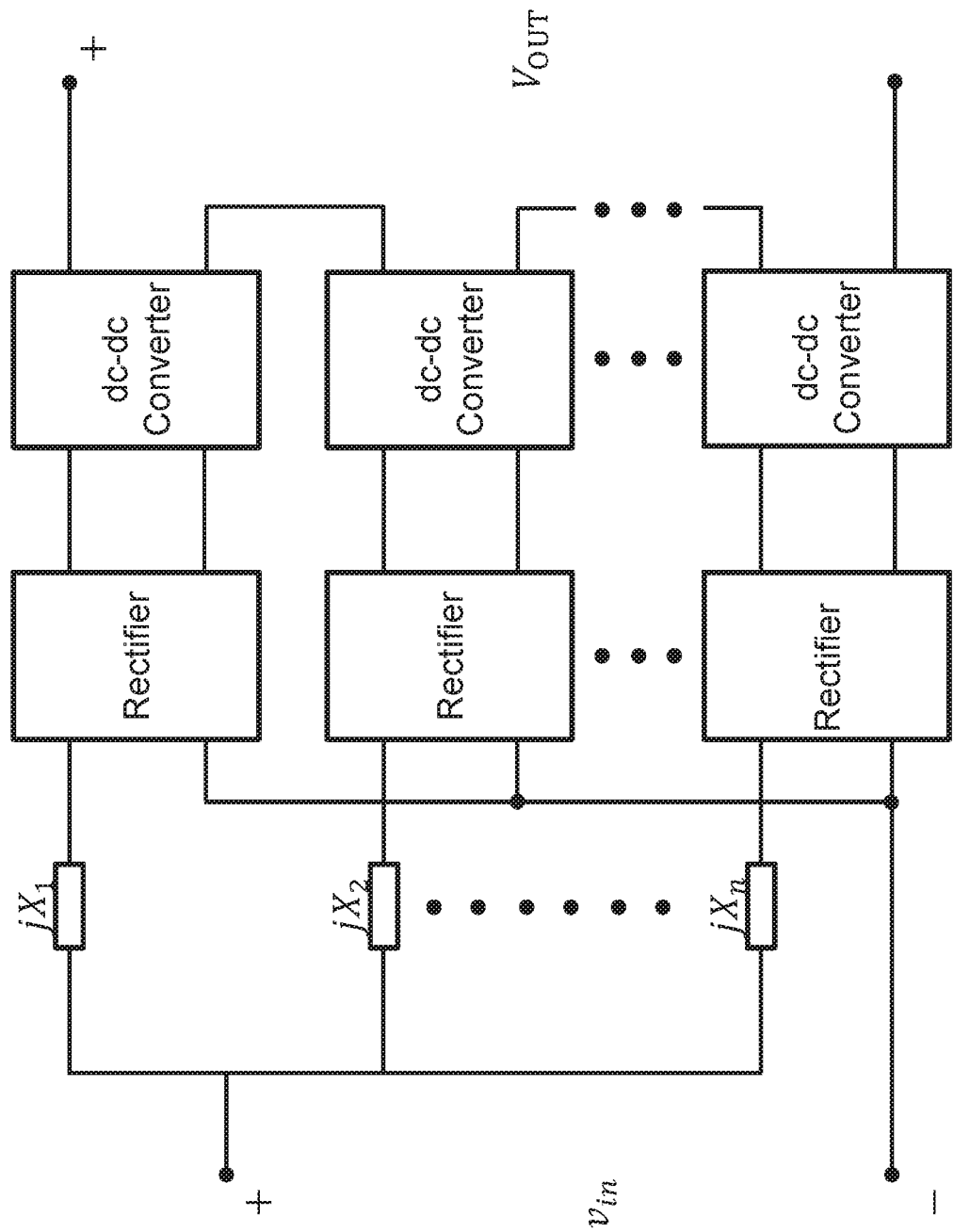
FIG. 23 depicts a schematic diagram of an example implementation of an AVR rectifier circuit, according to one or more embodiments described and shown herein.

In another implementation, an AVR rectifier may be provided in which the two resonant inductors of the AVR rectifier and one inductor of a compensation and matching network (such as in a capacitive or inductive wireless power transfer system) are realized in a single integrated magnetic structure using two coupled windings, as illustrated in FIG. 21. This can reduce each of passive component count, volume, cost and power losses.

h) AVR Rectifier with Multiple Rectifiers and Multiple Parallel-Connected Dc-Dc Converters In each implementation of the AVR rectifiers illustrated so far, the AVR rectifiers have included a power splitter with two differential reactance branches (+jX and −jX), two rectifiers and two dc-dc converters (or other voltage combiner). However, it is also possible to create a large number of embodiments of the AVR rectifier that use power splitters with multiple reactance branches, multiple rectifiers and multiple dc-dc converters whose outputs are connected in parallel, as shown in FIG. 22.

i) AVR Rectifier with Multiple Rectifiers and Multiple Series-Connected DC-DC Converters In another implementation, AVR rectifiers with multiple reactance legs, multiple rectifiers and multiple dc-dc converters whose outputs are connected in series may also be provided, as illustrated in FIG. 23.

j) AVR Rectifier with Multiple Rectifiers and a Power Combiner

Figure 24:
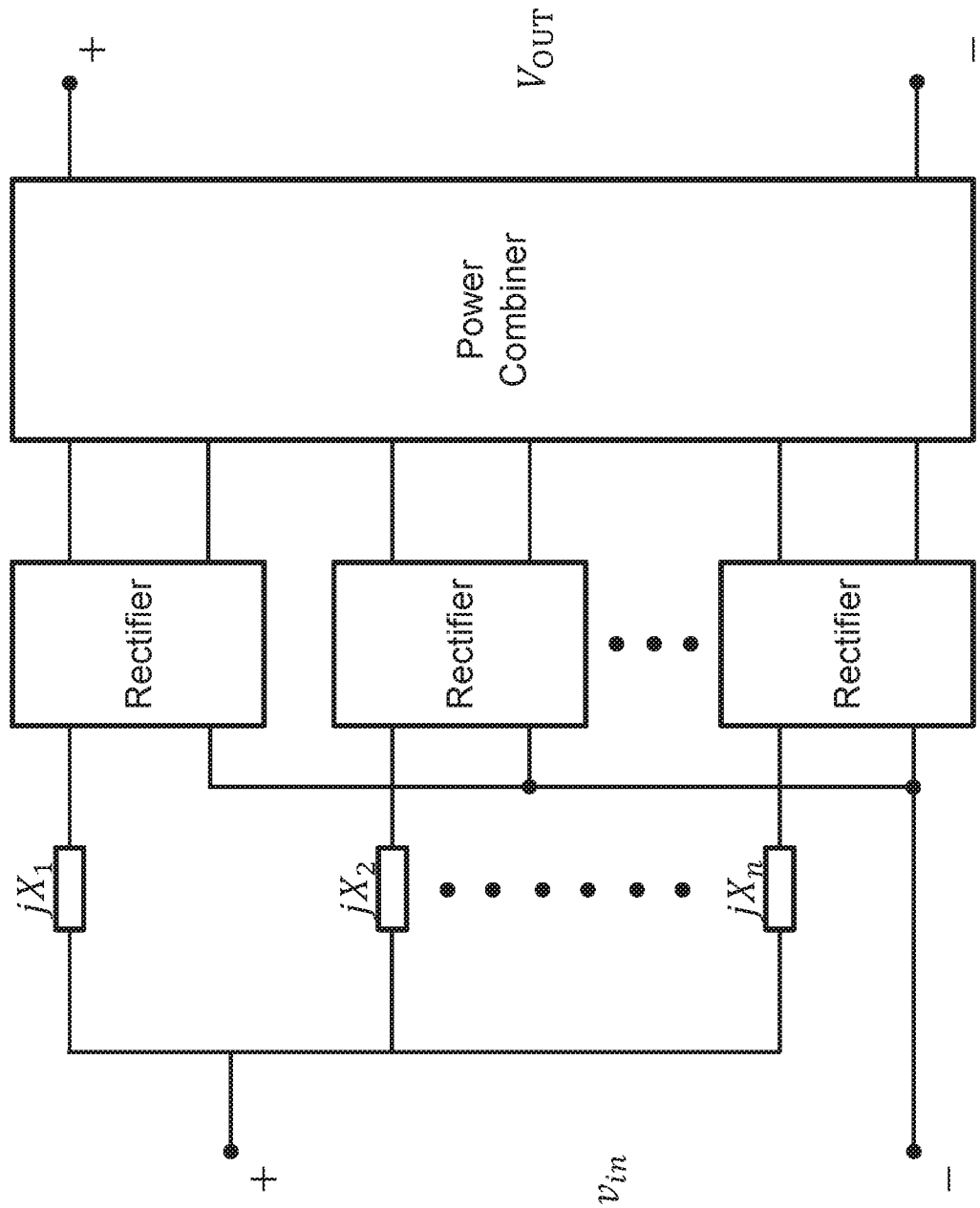
FIG. 24 depicts a schematic diagram of an example implementation of an AVR rectifier circuit, according to one or more embodiments described and shown herein.

In another implementation, AVR rectifiers with multiple reactance legs, multiple rectifiers and one power combiner may also be provided, as illustrated in FIG. 24. In this implementation, for example, the power combiner can have one of several implementations, including switched capacitor power combiners and resonant dc-dc converters utilizing impedance control networks.

k) AVR Rectifier with Boost Dc-Dc Converters

Figure 25:
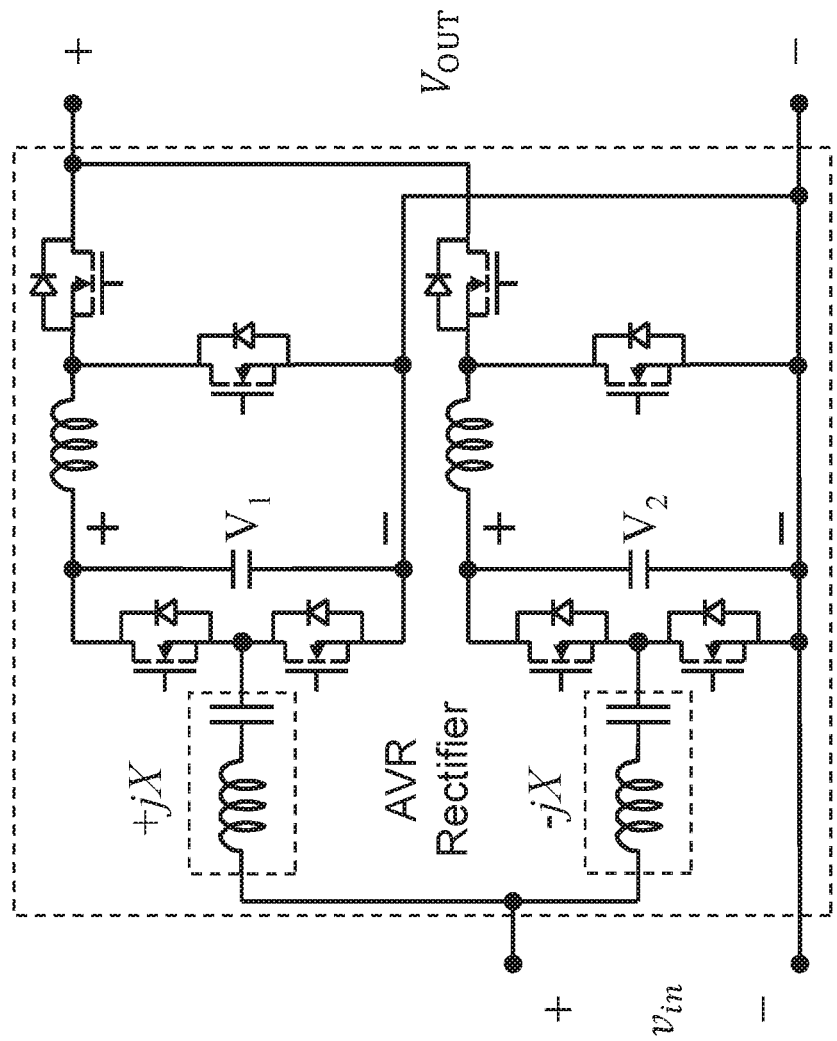
FIG. 25 depicts a schematic diagram of an example implementation of an AVR rectifier circuit, according to one or more embodiments described and shown herein.

In yet another implementation, dc-dc converters of any AVR rectifier variant may be realized as boost dc-dc converters, such as shown in FIG. 25.

l) AVR Rectifier with Buck Dc-Dc Converters

Figure 26:
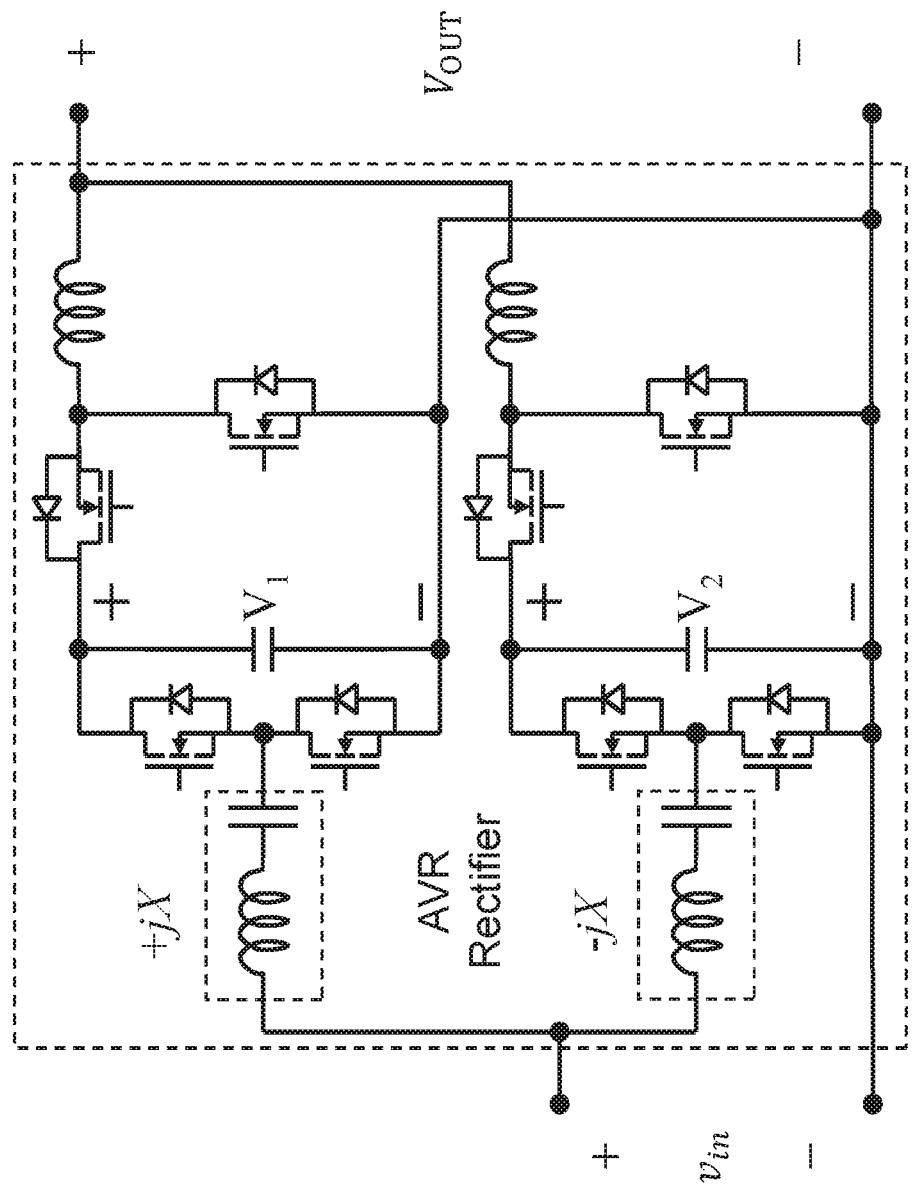
FIG. 26 depicts a schematic diagram of an example implementation of an AVR rectifier circuit, according to one or more embodiments described and shown herein.

In another implementation, dc-dc converters of any AVR rectifier variant may also be realized as buck dc-dc converters, such as shown in FIG. 26.

m) AVR Rectifier with Dc-Ac Converter

Figure 27:
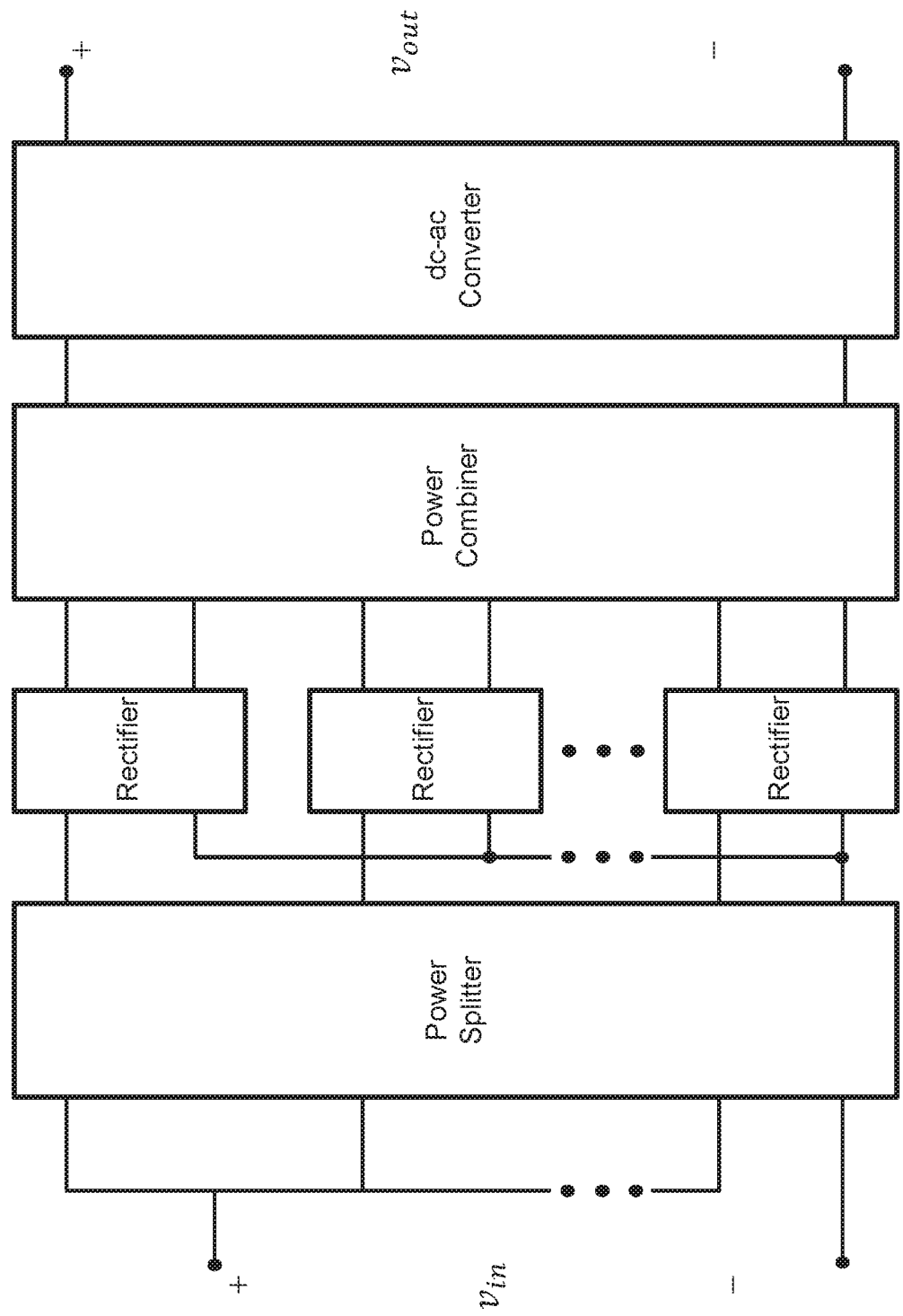
FIG. 27 depicts a schematic diagram of an example implementation of an AVR rectifier circuit, according to one or more embodiments described and shown herein.

In yet another implementation, any of the AVR rectifier variants described herein can be interfaced with a dc-ac converter to generate an ac voltage, such as a line-frequency (60 Hz or 50 Hz) ac voltage, such as illustrated in FIG. 27.

n) Wireless Power Transfer Systems Utilizing AVR Rectifiers

All the AVR rectifier variants described herein can be utilized in inductive and capacitive wireless power transfer systems, as illustrated in FIG. 28.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An active variable reactance rectifier circuit comprising:

an active variable reactance rectifier circuit input port;

an active variable reactance rectifier circuit output port adapted to couple to a load;

a power splitter circuit comprising a power splitter circuit input port coupled to the active variable reactance rectifier circuit input port, the power splitter circuit comprising a first power splitter circuit output port and a second power splitter circuit output port;

a first rectifier circuit comprising a first rectifier circuit input port and a first rectifier circuit output port, the first rectifier circuit input port coupled to the first power splitter circuit output port; a second rectifier circuit comprising a second rectifier circuit input port and a second rectifier circuit output port, the second rectifier circuit input port coupled to the second power splitter circuit output port;

a power combiner circuit comprising a first power combiner circuit input port, a second power combiner circuit input port and a power combiner circuit output port, wherein the first power combiner circuit input port is coupled to the first rectifier circuit output port, the second power combiner circuit input port is coupled to the second rectifier circuit output port and the power combiner circuit output port is coupled to the active variable reactance rectifier circuit output port; and wherein:

the power combiner circuit is adapted to independently control a first voltage level at the first rectifier circuit output port and a second voltage at the second rectifier circuit output port, the power splitter circuit comprises:

a first reactive network $+jX_1$ coupled between the active variable reactance rectifier circuit input port and the first rectifier circuit input port, a second reactive network $-jX_2$ coupled between the active variable reactance rectifier circuit input port and the second rectifier circuit input port, wherein $+jX_1$ and $-jX_2$ may be equal or unequal in magnitude but opposite in polarity, and wherein the power combiner circuit comprises at least one dc-dc converter coupled between at least one of the first and second rectifier circuit output ports and the active variable reactance rectifier circuit output port.

2. The active variable reactance rectifier circuit of claim 1 wherein the active variable reactance rectifier circuit is adapted to alter an input reactance of the active variable reactance rectifier circuit via a ratio of the first voltage level to a second voltage level.

3. The active variable reactance rectifier circuit of claim 1 wherein a gain and compensation network circuit and a wireless power transfer circuit (WPT) are coupled in series between a system input port and the active variable reactance rectifier circuit input port.

4. The active variable reactance rectifier circuit of claim 1 wherein the power combiner circuit comprises a first dc-dc converter coupled between the first rectifier circuit output port and the active variable reactance rectifier circuit output port and a second dc-dc converter coupled between the second rectifier circuit output port and the active variable reactance rectifier circuit output port.

5. The active variable reactance rectifier circuit of claim 1 wherein the active variable reactance rectifier circuit comprises a reactance amplification network circuit coupled between the active variable reactance rectifier circuit input port and the power splitter circuit, and the reactance amplification network circuit comprises an immittance network, wherein the immittance network amplifies an input impedance seen at the power splitter circuit input port.

6. The active variable reactance rectifier circuit of claim 1 wherein:
the power splitter circuit comprises the first reactive network coupled between the active variable reactance rectifier circuit input port and the first rectifier circuit input port and the second reactive network coupled between the active variable reactance rectifier circuit input port and the second rectifier circuit input port; and
the power combiner circuit comprises a first dc-dc converter comprising a first dc-dc converter output port and a second dc-dc converter comprising a second dc-dc converter output port, wherein the first and second dc-dc converter output ports are connected in parallel with respect to the active variable reactance rectifier circuit output port.

7. The active variable reactance rectifier circuit of claim 1 wherein:
the power splitter circuit comprises the first reactive network coupled between the active variable reactance rectifier circuit input port and the first rectifier circuit input port and the second reactive network coupled between the active variable reactance rectifier circuit input port and the second rectifier circuit input port; and
the power combiner circuit comprises a first dc-dc converter comprising a first dc-dc converter output port and a second dc-dc converter comprising a second dc-dc converter output port, wherein the first and second dc-dc converter output ports are connected in series with respect to the active variable reactance rectifier circuit output port.

8. The active variable reactance rectifier circuit of claim 1 wherein the at least one dc-dc converter comprises at least one of a boost dc-dc converter and a buck dc-dc converter.

9. The active variable reactance rectifier circuit of claim 1 wherein the first reactive network comprises a first inductor and the second reactive network comprises a second inductor, wherein the first inductor and second inductor are components of an integrated magnetic structure including two coupled windings.

10. The active variable reactance rectifier circuit of claim 1 wherein a gain and compensation network circuit and a wireless power transfer (WPT) coupler circuit are coupled in series between a system input port and the active variable reactance rectifier circuit input port and, either,
the WPT coupler circuit is disposed between the system input port and the gain and compensation network circuit, or
the gain and compensation network circuit is disposed between system input port and the WPT coupler circuit.

11. The active variable reactance rectifier circuit of claim 1 wherein:
the active variable reactance rectifier circuit comprises a reactance amplification network circuit coupled in series between the active variable reactance rectifier circuit input port and the power splitter circuit; and
a gain and compensation network circuit and a wireless power transfer (WPT) coupler circuit are coupled in series between a system input port and the active variable reactance rectifier circuit input port and, either:
the WPT coupler circuit is disposed between the system input port and the gain and compensation network circuit, or
the gain and compensation network circuit is disposed between system input port and the WPT coupler circuit.

12. The active variable reactance rectifier circuit of claim 1 wherein the active variable reactance rectifier circuit comprises a dc-ac converter coupled in series between the power combiner circuit output port and the active variable reactance rectifier circuit output port.

13. The active variable reactance rectifier circuit of claim 1 wherein the active variable reactance rectifier circuit comprises at least one gain and compensation network disposed between at least one power splitter circuit output port and at least one of the first and second rectifier circuit input ports.

14. The active variable reactance rectifier circuit of claim 1 wherein the active variable reactance rectifier circuit comprises a first gain and compensation network disposed between the first power splitter circuit output port and the first rectifier circuit input port and a second gain and compensation network disposed between the second power splitter circuit output port and the second rectifier circuit input port.

15. An active variable reactance rectifier circuit comprising:
a plurality of rectifier circuits each comprising a rectifier input port and a rectifier output port, each rectifier input port coupled to an active variable reactance rectifier circuit input port via a reactive network;
a power splitter circuit comprising a power splitter circuit input port coupled to the active variable reactance rectifier circuit input port, the power splitter circuit comprising a first power splitter circuit output port and a second power splitter circuit output port; and
a power combiner circuit comprising a plurality of combiner input ports each coupled to a respective one of the plurality of rectifier output ports and a combiner output port coupled to an active variable reactance circuit output port, wherein: the power combiner circuit is adapted to independently control a plurality of voltage levels at the plurality of rectifier output ports, and
wherein the power splitter circuit comprises:
a first reactive network $+jX_1$ coupled between the active variable reactance rectifier circuit input port and the first rectifier circuit input port,
a second reactive network $-jX_2$ coupled between the active variable reactance rectifier circuit input port and the second rectifier circuit input port, wherein $+jX_1$ and $-jX_2$ may be equal or unequal in magnitude but opposite in polarity, and wherein the power combiner circuit comprises at least one dc-dc converter coupled between at least one of the first and second rectifier circuit output ports and the active variable reactance rectifier circuit output port.

* * * * *